United States Patent
Ellebracht et al.

(10) Patent No.: US 11,883,793 B2
(45) Date of Patent: Jan. 30, 2024

(54) POROUS CERAMIC SUPPORTS FOR RESISTIVELY HEATED HYBRID GAS SORBENTS

(71) Applicant: Lawrence Livermore National Security, LLC, Livermore, CA (US)

(72) Inventors: Nathan C. Ellebracht, Oakland, CA (US); Sarah E. Baker, Dublin, CA (US); Eric B. Duoss, Dublin, CA (US); Simon Hoching Pang, Fremont, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 105 days.

(21) Appl. No.: 17/349,574

(22) Filed: Jun. 16, 2021

(65) Prior Publication Data

US 2022/0401917 A1    Dec. 22, 2022

(51) Int. Cl.
*B01J 20/28* (2006.01)
*B01J 20/32* (2006.01)
(Continued)

(52) U.S. Cl.
CPC .......... *B01J 20/262* (2013.01); *B01D 53/62* (2013.01); *B01D 53/82* (2013.01); *B01D 53/96* (2013.01); *B01J 20/0251* (2013.01); *B01J 20/28011* (2013.01); *B01J 20/28023* (2013.01); *B01J 20/28059* (2013.01); *B01J 20/28061* (2013.01); *B01J 20/28085* (2013.01); *B01J 20/3007* (2013.01); *B01J 20/3078* (2013.01); *B01J 20/3204* (2013.01); *B01J 20/3272* (2013.01); *B01J 20/3293* (2013.01); *B01J 20/3425* (2013.01); *B01J 20/3441* (2013.01);
(Continued)

(58) Field of Classification Search
CPC .......... B01J 20/262; B01J 20/0251; B01J 20/28011; B01J 20/28023; B01J 20/28059; B01J 20/28061; B01J 20/28085; B01J 20/3007; B01J 20/3078; B01J 20/3204; B01J 20/3272; B01J 20/3293; C01B 32/50; B01D 53/62; B01D 53/96; B01D 2253/202; B01D 2257/504
USPC ...................................... 423/228
See application file for complete search history.

(56) References Cited

U.S. PATENT DOCUMENTS 3,507,627 A    4/1970  Frant et al.
3,770,389 A    11/1973 Kitzner et al.
(Continued)

OTHER PUBLICATIONS

Moni et al., "Polysiloxane microspheres encapsulated in carbon allotropes: A promising material for supercapacitor and carbon dioxide capture", Journal of Colloid and Interface Science 542 (2019) 91-101. (Year: 2019).*

(Continued)

*Primary Examiner* — Anita Nassiri-Motlagh
(74) *Attorney, Agent, or Firm* — Zilka-Kotab, P.C.

(57) ABSTRACT

A porous sorbent ceramic product includes a three-dimensional structure having an electrically conductive ceramic material, wherein the conductive ceramic material has an open cell structure with a plurality of intra-material pores, a sorbent additive primarily present in the intra-material pores of the conductive ceramic material for adsorption of a gas, and at least two electrodes in electrical communication with the conductive ceramic material.

20 Claims, 7 Drawing Sheets

(51) Int. Cl.
*B01J 20/30* (2006.01)
*C01B 32/50* (2017.01)
*B01D 53/96* (2006.01)
*B01D 53/62* (2006.01)
*B01D 53/82* (2006.01)
*B01J 20/26* (2006.01)
*B01J 20/34* (2006.01)
*B01J 20/02* (2006.01)

(52) U.S. Cl.
CPC ........ *C01B 32/50* (2017.08); *B01D 2253/202* (2013.01); *B01D 2257/504* (2013.01); *C01B 2210/0007* (2013.01)

(56) References Cited

U.S. PATENT DOCUMENTS

| | | |
|---|---|---|
| 7,141,092 B1 | 11/2006 | Roychoudhury et al. |
| 8,298,986 B2 | 10/2012 | Jones et al. |
| 8,496,734 B2 | 7/2013 | Gadkaree et al. |

OTHER PUBLICATIONS

Du et al., "Carbon dioxide adsorbent based on rich amines loaded nano-silica", Journal of Colloid and Interface Science 409 (2013) 123-128. (Year: 2013).*

Sujan et al., "Poly(glycidyl amine)-Loaded SBA-15 Sorbents for CO2 Capture from Dilute and Ultradilute Gas Mixtures," ACS Applied Polymer Materials, vol. 1, 2019, pp. 3137-3147.

Thompson et al., "Intrinsic Thermal Desorption in a 3D Printed Multifunctional Composite CO2 Sorbent with Embedded Heating Capability," ACS Applied Materials & Interfaces, vol. 11, 2019, pp. 43337-43343.

Wijesiri et al., "Desorption Process for Capturing CO2 from Air with Supported Amine Sorbent," Industrial & Engineering Chemistry Research, vol. 58, 2019, pp. 15606-15618.

Woolfenden et al., "Sorbent-based sampling methods for volatile and semi-volatile organic compounds in air. Part 2. Sorbent selection and other aspects of optimizing air monitoring methods," Journal of Chromatography A, vol. 1217, 2010, pp. 2685-2694.

Xu et al., "Novel Polyethylenimine-Modified Mesoporous Molecular Sieve of MCM-41 Type as High-Capacity Adsorbent for CO2 Capture," Energy & Fuels, vol. 16, 2002, pp. 1463-1469.

Armand et al., "Ionic-liquid materials for the electrochemical challenges of the future," Nature Materials, vol. 8, Aug. 2009, pp. 621-629.

Galinsky et al., "Ionic liquids as electrolytes," Electrochimica Acta 51, 2006, pp. 5567-5580.

Sanz-Perez et al., "Direct Capture of CO2 from Ambient Air," Chemical Reviews, vol. 116, 2016, pp. 11840-11876.

Fasifi et al., "Techno-economic assessment of CO2 direct air capture plants," Journal of Cleaner Production, vol. 224, 2019, pp. 957-980.

Sakwa-Novak et al., "Poly(ethylenimine)-Functionalized Monolithic Alumina Honeycomb Adsorbents for CO2 Capture from Air," ChemSusChem, vol. 9, Jun. 2016, pp. 1859-1868.

Sakwa-Novak, M., "Supported Poly(Ethyleneimine) Adsorbents for CO2 Removal from Air," Dissertation, Georgia Institute of Technology, Dec. 2015, 227 pages.

Zhu et al., "Molecular Blends of Methylated-Poly(ethylenimine) and Amorphous Porous Organic Cages for SO2 Adsorption," Journal of Materials Chemistry A, vol. 6, 2018, 31 pages.

Pang et al., "Design of Aminopolymer Structure to Enhance Performance and Stability of CO2 Sorbents: Poly (propylenimine) vs Poly(ethylenimine)," Journal of the American Chemical Society, vol. 139, 2017, pp. 3627-3630.

Pang et al., "Oxidatively-Stable Linear Poly(propylenimine)-Containing Adsorbents for CO2 Capture from Ultradilute Streams," ChemSusChem, 2018, 11 pages, retrieved from https://www.semanticscholar.org/paper/Oxidatively-Stable-Linear-Adsorbents-for-CO2-from-Pang-Lively/da64397ae790bd9405a49d8664d3bc5490458955.

Harley-Trochimczyk et al., "Catalytic hydrogen sensing using microheated platinum nanoparticle-loaded graphene aerogel," Sensors and Actuators B: Chemical, vol. 206, Jan. 2015, 26 pages, retrieved from https://www.sciencedirect.com/science/article/abs/pii/S0925400514011265.

Zou et al., "Electrothermal regeneration by Joule heat effect on carbon cloth based MnO2 catalyst for long-term formaldehyde removal," Chemical Engineering Journal, vol. 357, 2019, pp. 1-10.

Li et al., "Metallic-substrate-supported manganese oxide as Joule-heat-ignition catalytic reactor for removal of carbon monoxide and toluene in air," Chemical Engineering Journal, vol. 328, 2017, pp. 1058-1065.

Roychoudhury et al., "Resistively-Heated Microlith-Based Adsorber for Carbon Dioxide and Trace Contaminant Removal," SAE Transactions, 2005, 8 pages.

Wojtowicz et al., "Reversible Ammonia Sorption for the Primary Life Support System (PLSS)," American Institute of Aeronautics and Astronautics, 2012, 16 pages.

Wojtowicz et al., "Co-adsorption of Ammonia and Formaldehyde on Regenerable Carbon Sorbents for the Primary Life Support System (PLSS)," 46th International Conference on Environmental Systems, Jul. 2016, 9 pages.

Ge et al., "Joule-heated graphene-wrapped sponge enables fast clean-up of viscous crude oil spill," Nature Nanotechnology, Apr. 2017, 9 pages.

Park et al., "Selective Surface Functionalization of Silicon Nanowires via Nanoscale Joule Heating," Nano Letters, vol. 7, No. 10, 2007. pp. 3106-3111.

Yao et al., "Carbon Welding by Ultrafast Joule Heating," Nano Letters, vol. 16, 2016, 21 pages.

Kwabi et al., "pH Swing Cycle for CO2 Capture Electrochemically Driven through Proton-Coupled Electron Transfer," ChemRxiv, 2019, 31 pages, retrieved from https://chemrxiv.org/articles/preprint/pH_Swing_Cycle_for_CO2_Capture_Electrochemically_Driven_through_Proton-Coupled_Electron_Transfer/7853414.

Stern et al., "Post-combustion carbon dioxide capture using electrochemically mediated amine regeneration," Energy & Environmental Science, vol. 6, 2013, pp. 2505-2517.

Li et al., "Electrolytic Conversion of Bicarbonate into CO in a Flow Cell," Joule, vol. 3, Jun. 2019, pp. 1487-1497.

Baker et al., "Getting to Neutral," Revision 1, Lawrence Livermore National Laboratory, Aug. 2020, 178 pages.

Song et al., "Moisture Swing Ion-Exchange Resin-PO4 Sorbent for Reversible CO2 Capture from Ambient Air," Energy & Fuels, vol. 33, 2019, pp. 6562-6567.

Liu et al., "Porous polymeric resin for adsorbing low concentration of VOCs: Unveiling adsorption mechanism and effect of VOCs' molecular properties," Separation and Purification Technology, vol. 228, 2019, pp. 1-8.

Long et al., "Characterization of Hydrophobic Hypercrosslinked Polymer as an Adsorbent for Removal of Chlorinated Volatile Organic Compounds," Environmental Science and Technology, Apr. 13, 2011, pp. 4506-4512.

Vinodh et al., "Novel microporous hypercross-linked polymers as sorbent for volatile organic compounds and CO2 adsorption," Journal of Industrial and Engineering Chemistry, vol. 21, 2015, pp. 1231-1238.

Janus et al., "Dynamic adsorption-desorption of methyl ethyl ketone on MCM-41 and SBA-15 decorated with thermally activated polymers," Journal of Industrial and Engineering Chemistry, vol. 71, 2019, pp. 465-480.

Harper, M., "Sorbent trapping of volatile organic compounds from air," Journal of Chromatography A, vol. 885, 2000, pp. 129-151.

Yan et al., "Preparation of Ordered Mesoporous SiC from Preceramic Polymer Templated by Nanoporous Silica," The Journal of Physical Chemistry B, vol. 110, 2006, pp. 5429-5433.

Naviroj et al., "Directionally aligned macroporous SiOC via freeze casting of preceramic polymers," Journal of the European Ceramic Society, vol. 35, 2015, pp. 2225-2232.

(56) References Cited

OTHER PUBLICATIONS

Yuan et al., "Preparation of ordered mesoporous silicon carbide monoliths via preceramic polymer nanocasting," Microporous and Mesoporous Materials, vol. 142, 2011, pp. 754-758.
Laine et al., "Preceramic Polymer Routes to Silicon Carbide," Chemistry of Materials, vol. 5, 1993, pp. 280-279.
Wang et al., "Designing Moisture-Swing $CO_2$ Sorbents through Anion Screening of Polymeric Ionic Liquids," Energy Fuels, vol. 31, 2017, pp. 11127-11133.
Wang et al., "Moisture Swing Sorbent for Carbon Dioxide Capture from Ambient Air," Environmental Science and Technology, vol. 45, 2011, pp. 6670-6675.
Wang et al., "Spontaneous Cooling Absorption of $CO_2$ by a Polymeric Ionic Liquid for Direct Air Capture," The Journal of Physical Chemistry Letters, vol. 8, 2017, pp. 3986-3990.
Vakifahmetoglu et al., "Porous polymer derived ceramics," Materials Science and Engineering R, vol. 106, 2016, pp. 1-30.
Wurzbacher et al., "Separation of $CO_2$ from air by temperature-vacuum swing adsorption using diamine-functionalized silica gel," Energy & Environmental Science, vol. 4, 2011, pp. 3584-3592.
Chaikittisilp et al., "Mesoporous Alumina-Supported Amines as Potential Steam-Stable Adsorbents for Capturing $CO_2$ from Simulated Flue Gas and Ambient Air," Energy & Fuels, vol. 25, 2011, pp. 5528-5537.
Chaikittisilp et al., "Poly(allylamine) Mesoporous Silica Composite Materials for $CO_2$ Capture from Simulated Flue Gas or Ambient Air," Industrial & Engineering Chemistry Research, vol. 50, 2011, pp. 14203-14210.
Darunte et al., "Monolith-Supported Amine-Functionalized Mg2(dobpdc) Adsorbents for $CO_2$ Capture," ACS Applied Materials & Interfaces, vol. 9, 2017, pp. 17042-17050.
Deckers et al., "Additive Manufacturing of Ceramics: A Review," Journal of Ceramic Science and Technology, vol. 05, 2014, pp. 245-260.
Eckel et al., "Additive manufacturing of polymer-derived ceramics," Science, vol. 351, No. 6268, Jan. 1, 2016, pp. 58-62.
Gebald et al., "Stability of Amine-Functionalized Cellulose during Temperature-Vacuum-Swing Cycling for $CO_2$ Capture from Air," Environmental Science & Technology, vol. 47, 2013, pp. 10063-10070.
Kwon et al., "Aminopolymer-Impregnated Hierarchical Silica Structures: Unexpected Equivalent $CO_2$ Uptake under Simulated Air Capture and Flue Gas Capture Conditions," Chemistry of Materials, vol. 31, 2019, pp. 5229-5237.
Labreche et al., "Post-spinning infusion of poly(ethyleneimine) into polymer/silica hollow fiber sorbents for carbon dioxide capture," Chemical Engineering Journal, vol. 221, 2013, pp. 166-175.
Li et al., "Steam-Stripping for Regeneration of Supported Amine-Based $CO_2$ Adsorbents," ChemSusChem, vol. 3, 2010, pp. 899-903.
Marotta et al., "The use of a localized heating protocol in heterogeneous catalysis," Journal of Molecular Catalysis A: Chemical, vol. 195, 2003, pp. 209-218.
Moreno-Castilla et al., "Carbon-Based Honeycomb Monoliths for Environmental Gas-Phase Applications," Materials, vol. 3, 2010, pp. 1203-1227.
Pelissier et al., "Heating Elements," Ceramics International, vol. 24, 1998, pp. 371-377.
Sakawa-Noval et al., "Steam Induced Structural Changes of a Poly(ethylenimine) Impregnated ?—Alumina Sorbent for $CO_2$ Extraction from Ambient Air," ACS Applied Materials & Interfaces, vol. 6, 2014, pp. 9245-9255.
Sayari et al., "Enhanced Adsorption Efficiency through Materials Design for Direct Air Capture over Supported Polyethylenimine," ChemSusChem, vol. 9, 2016, pp. 2796-2803.
Song et al., "Quaternized Chitosan/PVA Aerogels for Reversible $CO_2$ Capture from Ambient Air," Industrial & Engineering Chemistry Research, vol. 57, 2018, pp. 4941-4948.

\* cited by examiner

POROUS CERAMIC SUPPORTS FOR RESISTIVELY HEATED HYBRID GAS SORBENTS

This invention was made with Government support under Contract No. DE-AC52-07NA27344 awarded by the United States Department of Energy. The Government has certain rights in the invention.

FIELD OF THE INVENTION

The present invention relates to gas sorbents, and more particularly, this invention relates to porous ceramic supports for resistively heated hybrid gas sorbents, and methods of making same.

BACKGROUND

Mitigating the complex and adverse effects related to increased atmospheric carbon dioxide ($CO_2$) concentrations depends on global reduction in greenhouse gas (GHG) emissions as well as technologies which actively remove $CO_2$ or other GHGs from the environment. Important aspects of efforts to regulate atmospheric GHG concentrations include gas sorbents which remove $CO_2$ from waste streams (flue gas, fermentation off-gas, etc.) to reduce GHG emissions or directly from ambient air (direct air capture, DAC) to remove $CO_2$ from the carbon cycle. However, the associated costs of capturing $CO_2$ or other GHGs are high, especially in DAC technologies, due to the significant energy requirements for sorbent regeneration. Technologies capable of capturing GHGs like $CO_2$ using lower energy may reduce the overall cost of emission reduction and negative emission technologies.

Additionally, the use of electricity as an energy source is advantageous compared to thermal energy from burning of natural gas or other fossil-derived fuels which emit $CO_2$ and reduce the net emissions of a process. Thus, a major limitation of the conventional process is the use of non-sustainable fossil resources, e.g., natural gas. In sharp contrast, renewable electricity has growing availability and the cost is becoming more affordable. The use of fossil fuels to provide external heat is a primary challenge of these conventional capture processes since the use of fossil fuels leads to more $CO_2$ production.

Solid-supported aminopolymers may be an economically viable technology for direct air capture. As illustrated in the schematic drawing in FIG. 1, gas mixtures having ultra-dilute concentrations of $CO_2$ may flow over a $CO_2$ chemisorbent to which the $CO_2$ molecule bind. Compared to conventional absorber technologies that use aqueous or other liquid $CO_2$ sorbents, lack of solvent in solid-supported aminopolymers results in lower heating requirements for thermal regeneration. However, releasing the $CO_2$ from the sorbent, i.e., regeneration, is typically an energy intensive process that may include greater than 80% of the total process energy. The land area required for energy generation may be greater than the constructed DAC footprint. Thus, much of the cost of separating gases depends on the cost of regenerating the sorbent material via expensive energy inefficient heating processes.

Moreover, sorbent regeneration may include potentially damaging processes to the sustainability of the solid-supported aminopolymers. In one typical approach, the hybrid sorbents are regenerated at elevated temperatures (around 100° C.) with steam, releasing the captured $CO_2$ in a concentrated stream after condensing the water vapor. Unfortunately, there are significant drawbacks to using steam for thermal regeneration. Steam stripping is an indirect heating approach and relies on additional downstream separations as well as, usually, burning natural gas for steam generation. Moreover, the use of steam tends to reduce sorbent lifetime by leaching the active capture polymer phase (e.g., sorbent), damaging the active capture polymer material, altering the support material, etc. Commonly, the active sorbent material is leached from the support by the condensing water. In addition, steam is typically generated using heating systems that burn natural gas, thereby generating more $CO_2$.

Alternative approaches to steam for regenerating $CO_2$ sorbents have included elevated temperature and applied vacuum through temperature vacuum swing adsorption (TVSA). However, gas adsorption and separations (e.g., DAC) having high heats of adsorption subsequently rely on very high energy requirements.

Conventional approaches to regenerating $CO_2$ sorbents during DAC including supported aminopolymers rely on energy inefficient processes, such as steam stripping, non-scalable indirect heating approaches, etc. for regeneration. These technologies have trade-offs in sorbent performance, stability, scalability, cycling, etc.

An energy- and cost-efficient system of gas regeneration having a stable longevity of use remains elusive. In addition, it would be preferable to remove steam, which tends to be destructive to the sorbent material, from the regeneration process. Moreover, it is desirable to improve energy efficiency of gas adsorption cycles, especially in gas desorption and sorbent regeneration for large commercial scale applications.

SUMMARY

In one embodiment, a porous sorbent ceramic product includes a three-dimensional structure having an electrically conductive ceramic material, where the conductive ceramic material has an open cell structure with a plurality of intra-material pores, a sorbent additive primarily present in the intra-material pores of the conductive ceramic material for adsorption of a gas, and at least two electrodes in electrical communication with the conductive ceramic material.

In another embodiment, a method of forming a product for separating gases includes forming a three-dimensional ceramic support, heating the three-dimensional ceramic support at a temperature for an effective duration of time to result in the conductive ceramic material having a plurality of intra-material pores, and incorporating a sorbent additive into the intra-material pores of the conductive ceramic material. Moreover, the three-dimensional ceramic support includes an electrically conductive ceramic material configured for joule heating.

In yet another embodiment, a method of using a porous sorbent ceramic product having a sorbent additive for separating gases includes contacting a gas stream having a mixture of more than one gas with the porous sorbent ceramic product for causing sorption of a first of the gases by the sorbent additive, and applying an electrical current to the porous sorbent ceramic product for causing joule heating of the porous sorbent ceramic product to a pre-defined temperature for desorbing the first gas from the sorbent additive.

Other aspects and advantages of the present invention will become apparent from the following detailed description, which, when taken in conjunction with the drawings, illustrate by way of example the principles of the invention.

DETAILED DESCRIPTION

Figure 1:
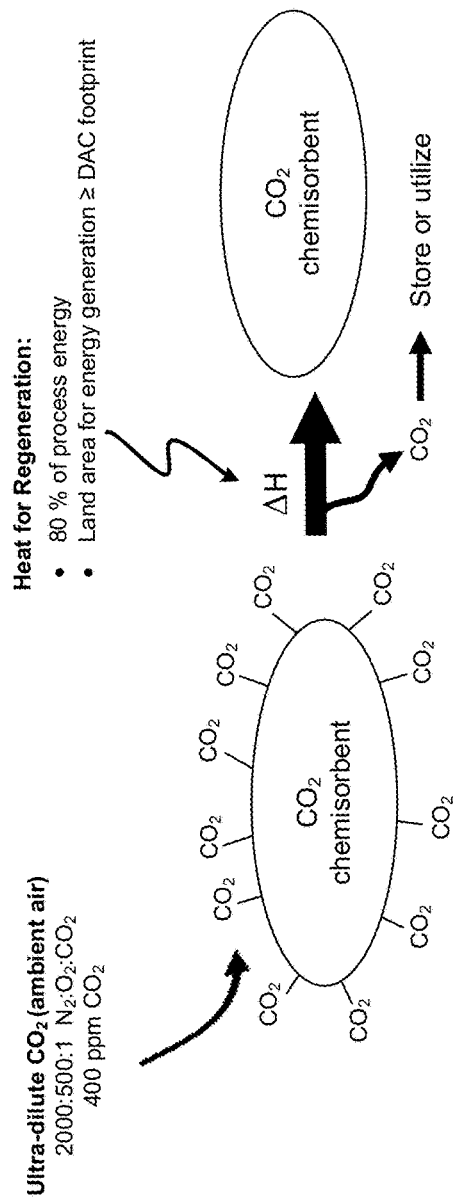
FIG. 1 is a schematic drawing of a process using a conventional chemisorbent for $CO_2$ capture from ambient air (direct air capture).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt. % is defined as the percentage of weight of a particular component is to the total weight/mass of the mixture. Vol. % is defined as the percentage of volume of a particular compound to the total volume of the mixture or compound. Mol. % is defined as the percentage of moles of a particular component to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of a mixture, an ink, a printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive concepts described herein. It should be understood that "inks" (and singular forms thereof) may be used interchangeably and refer to a composition of matter dispersed throughout a liquid phase such that the composition of matter may be "written," extruded, printed, or otherwise deposited to form a layer that substantially retains its as-deposited geometry and shape with perhaps some, but preferably not excessive, sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, binder-jet fabrication with powders, powder-bed laser fusion, or other equivalent techniques and therefore exhibit unique structural and compositional characteristics conveyed via the precise control allowed by such techniques. The physical characteristics a structure formed by DIW may include having lower layers of the structure are slightly flattened, slightly disfigured from original extrusion, etc. by weight of upper layers of structure, due to gravity, due to nozzle offset height, etc. The three-dimensional structure formed by DIW may have a single continuous filament, ligament, strand, feature, etc. that makes up at least two layers of the 3D structure.

The following description discloses several preferred embodiments of a ceramic supports for resistively heated hybrid gas sorbents and/or related systems and methods.

In one general embodiment, a porous sorbent ceramic product includes a three-dimensional structure comprising an electrically conductive ceramic material, wherein the conductive ceramic material has an open cell structure with a plurality of intra-material pores, a sorbent additive primarily present in the intra-material pores of the conductive ceramic material for adsorption of a gas, and at least two electrodes in electrical communication with the conductive ceramic material.

In another general embodiment, a method of forming a product for separating gases includes forming a three-dimensional ceramic support, heating the three-dimensional ceramic support at a temperature for an effective duration of time to result in the conductive ceramic material having a plurality of intra-material pores, and incorporating a sorbent additive into the intra-material pores of the conductive ceramic material. Moreover, the three-dimensional ceramic support includes an electrically conductive ceramic material configured for joule heating.

In yet another general embodiment, a method of using a porous sorbent ceramic product having a sorbent additive for separating gases includes contacting a gas stream having a mixture of more than one gas with the porous sorbent ceramic product for causing sorption of a first of the gases by the sorbent additive, and applying an electrical current to the porous sorbent ceramic product for causing joule heating of the porous sorbent ceramic product to a pre-defined temperature for desorbing the first gas from the sorbent additive.

A list of acronyms used in the description is provided below.
3D three-dimensional
B boron
C Celsius
$CO_2$ carbon dioxide
DAC direct air capture
DIW direct ink writing
GHG greenhouse gas
ms millisecond
nm nanometer
PEI poly(ethylenimine)
SiC silicon carbide
$Si_3N_4$ silicon nitride
TVSA temperature vacuum swing adsorption
μm micron
wt. % weight percent Energy efficiency of sorbent regeneration is a key aspect of process economics in gas separations. Energy requirements for separations requiring strong binding for selective separations, like removal of carbon dioxide ($CO_2$) from ambient air in direct air capture (DAC) processes, primarily come from the regeneration step. Indirect heating approaches like the use of a carrier with significant thermal energy, like steam, or external heating relying on conduction are inefficient and energy intensive. The use of resistive (joule) heating to provide efficient and local heating in a solid sorbent during a desorption step may greatly reduce energy requirements for regeneration. Utilization of electricity rather than thermal energy from burning hydrocarbon fuels like natural gas additionally improves the net emissions of a process seeking to capture a greenhouse gas like $CO_2$ from a gas stream, like flue gas, directly from the air, etc.

Various embodiments described herein utilizes a unique combination of materials and additives to achieve gas adsorption and regeneration. One approach utilizes porous ceramic support materials which are highly stable, extremely tunable, and have appropriate chemical and physical properties to support amine-containing additives and be heated via joule heating. As described herein, distributed heating may be achieved via resistive heating, also known as joule heating, of a sorbent material. Joule heating provides a novel approach to adsorption and gas separation processes that include regeneration of direct air capture (DAC) sorbents for removal of $CO_2$ from ambient air.

According to various embodiments described herein, a selective gas may be removed from mixed gas streams using a porous ceramic material having an additive capable of gas adsorption. In preferred embodiments, the porous sorbent ceramic material includes integrated heating with an active support having conductive porous ceramic for efficient cycling with local joule heating, and thus the porous ceramic material may be regenerated to allow for collection of adsorbed gas. For example, in one preferred approach, a porous ceramic material may include a sorbent additive capable of $CO_2$ adsorption to selectively remove $CO_2$ from mixed gas streams. In various approaches, the combined sorbent material (support+additive) may be used to selectively remove gas from a variety of streams, including flue gas, biogas, fermenter off-gas, ambient air, etc. The sorbent material may remove $CO_2$ from air in a process termed direct air capture (DAC). The sorbent may be heated via resistive (joule) heating to aid in the desorption of adsorbed gases and regeneration of the sorbent material for further gas adsorption. The sorbent may be regenerated additionally by including humidity and/or vacuum swing with or without the aid of a sweep gas.

In other applications, resistive heating has been utilized for temperature management in solid materials for catalysis, adsorption, other applications, etc. Some applications have implemented resistive heating for regeneration of sorbent materials, however, each of these examples suffer from various drawbacks. In some applications of absorption, metal meshes coated with a zeolite sorbent were utilized for gas contaminant removal and regenerated in part by resistive heating of the coated metal. However, coated metals suffer from very low sorbent loadings relative to the heating element and, thus, the process has is difficult to scale. In another related example, zeolite-based $CO_2$ sorbents were 3D printed via direct ink writing using a metal-containing ink to form a composite sorbent material for adsorption and resistive heating. However, utilizing zeolite-based active sorbent phases is not applicable to capture of ultra-dilute $CO_2$ from ambient air in direct air capture.

In another example, carbon-based monolithic supports with gas adsorbing coatings or additives have been used to capture ammonia and $CO_2$ with the capability of regeneration with resistive heating. However, 3D printed composite zeolite/metal sorbents have demonstrated significant decreases in sorbent surface area and performance with the introduction of the metal dopant for resistive heating. Thus, examples of carbon-based supports for resistively heated sorbents are not as robust as embodiments described herein. Carbon is weaker, less chemically inert, less thermally stable, and have less tunable properties such as thermal and electrical conductivity than the ceramic-based supports as described herein.

Various embodiments described herein utilize joule heating to provide the thermal energy for the regeneration of a hybrid sorbent comprised of a porous conductive ceramic support and an amine-based gas adsorbing additive. Ceramic supports are thermally and chemically stable, oxidatively resistant, chemically inert, and similar to commonly used, inactive oxide supports, and there are many potential synthesis routes which allow for precise control over material form and properties.

In some approaches, a porous ceramic product may include a sorbent additive used for sorption of volatile organic compounds, gas separations, vapor separations, etc. In some approaches, non-amine-containing sorbent additives may be primarily present within the pores of the ceramic support. Sorbent additives for volatile organic sorption may include aromatic polymers (e.g., poly(styrene), poly(divinylbenzene), etc.), non-aromatic polymers (e.g., poly(acrylonitrile), etc.), copolymers, other inorganic additives, etc. Sorbent additives may be impregnated into the pores of the ceramic support or polymerized in situ. In each case regeneration of the sorbent ceramic product may be aided by heat where the ceramic structure may exhibit sufficient joule heating upon application of an electric current to provide the requisite temperature change to regenerate the sorbent additive either alone or in combination with a moisture-swing, vacuum-swing, or sweep gas.

In preferred approaches, a hierarchical porous ceramic support may be synthesized via various methods including partial sintering from powder or templated preceramic polymer precursors. The ceramic support has appropriate physical properties including porosity, electrical and thermal conductivity, and pore sizes. The gas sorbent may be fully fabricated with the addition of an amine-based sorbent, e.g., aminopolymers including poly(ethylenimine), to the porous ceramic support using generally known impregnation techniques. The hybrid support material is used to efficiently adsorb a selective gas, e.g., $CO_2$, from a mixed gas stream, including ambient air in direct capture. The sorbent support structure may be regenerated with a process involving temperature swing wherein the heating is provided by direct joule heating of the support material and the incorporated sorbent to release the adsorbed gas, e.g., $CO_2$.

Figure 2:
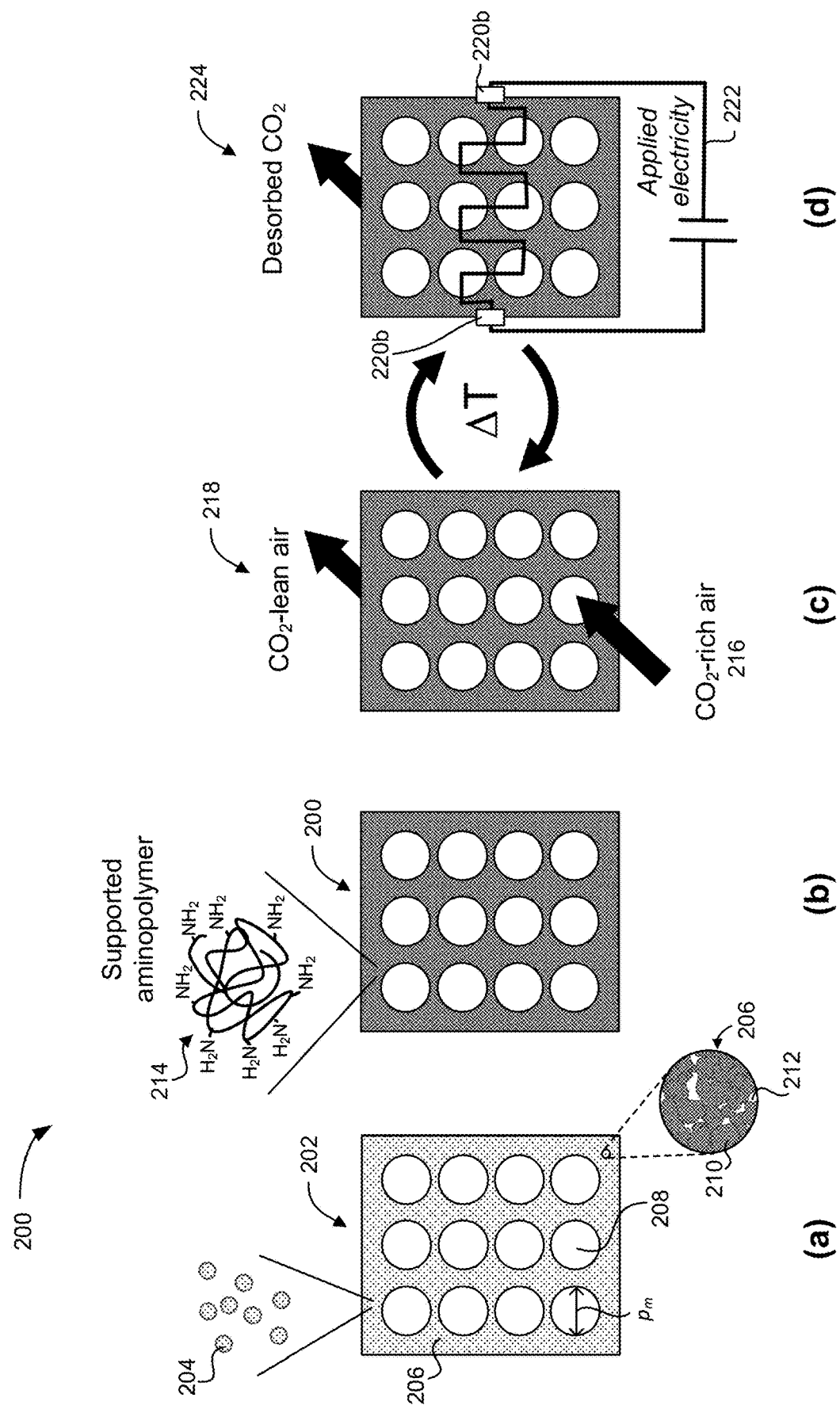
FIG. 2 is a stepwise series of drawing of a porous ceramic support for resistively heated hybrid gas sorbents, according to one embodiment. Part (a) represents the formation of a porous ceramic support. Part (b) represents incorporation of an aminopolymer sorbent additive to the porous ceramic support. Part (c) represents capture of $CO_2$ from a mixed gas by the porous ceramic support having a sorbent. Part (d) represents the regeneration of $CO_2$ from the porous ceramic supporting having a sorbent using resistive heating.

FIG. 2 illustrates a schematic diagram of the components of a porous sorbent ceramic product 200, in accordance with one embodiment. As an option, the present product 200 may be implemented in conjunction with features from any other inventive concept listed herein, such as those described with reference to the other FIGS. Of course, however, the product 200 and others presented herein may be used in various applications and/or in permutations which may or may not be specifically described in the illustrative embodiments listed herein. Further, the product 200 presented herein may be used in any desired environment.

As shown in part (a) of FIG. 2, a porous sorbent ceramic product 200 includes a three-dimensional (3D) structure 202 including and electrically conductive ceramic material 206. The 3D structure 202 may include features, inter-material pores 208 (where the pore is formed from a shape of the material), voids for the flow of the mixed gas stream through the porous sorbent ceramic product 200. In one approach the 3D structure 202 may be a monolithic form for low gas flow pressure drop.

Looking to the magnified view of a portion of conductive ceramic material 206, the ceramic material 206 includes partially sintered ceramic particles 210 and an open cell structure with a plurality of intra-material pores 212. The open cell structure of the material may be defined as having interconnected pores, the pores are not sealed, the void space created within the pores allows the flow of gas, liquid, etc. to pass through the material, etc. The ceramic material 206 may be a mesoporous material having intra-material pores 212 with an average diameter in a range of about greater than 1 nanometer (nm) to about 50 nm. In some approaches, the intra-material pores 212 of the ceramic material 206 may be in a range of greater than 1 nm to less than 10 μm. In one approach, the intra-material pores 212 of the ceramic material 206 may be in a range of greater than 1 nm to about 1000 nm.

The electrically conductive ceramic material 206 of the 3D structure 202 may be formed from a powder 204 of ceramic material. The 3D structure 202, e.g., support structure, may be comprised of one or more of a variety of ceramic materials, including a metal carbide, a metalloid carbide, a metal boride, a metalloid boride, a metal oxide, a metalloid oxide, a metal nitride, a metalloid nitride, a metal silicide, or a combination thereof. For example, in some approaches, the ceramic material may include SiC, SiOC, SiCN, $MoSi_2$, SixNy, BxC, BN, BCN, AlN, etc. In some approaches, a ceramic material may be partially doped, e.g., have non-integer stoichiometries. For example, a SiC may have more carbon than silicon. In one approach, the conductivity may be tuned with a doped ceramic material.

The ceramic support may be synthesized via a variety of techniques utilizing preceramic polymers, ceramic powders, etc. including partial sintering, replica or sacrificial templating, direct foaming, bonding, aerogel formation, freeze-casting, or others. Additive manufacturing approaches including but not limited to direct ink writing, powder bed fusion, jetting, extrusion, or deposition may be used in the synthesis of the support material.

According to one embodiment, the 3D structure, e.g., bulk structure, includes a ceramic material comprising connections between particles thereby forming a porous material. The material of the conductive ceramic support structure is porous, with multiple possible scales of hierarchical porosity. The material may have intra-material pores creating a small-scale, microporosity, or mesoporosity of intra-material pores having an average diameter in the range of greater than 1 to 1000 nanometers (nm) and/or a macroporosity of intra-material macropores having an average diameter in a range of greater than or equal to 10 micron (μm). In some approaches a material may have a number of length scales or pores, e.g., microporosity and mesoporosity, mesoporosity and microporosity, etc., all of which may be considered as intra-material pores. Moreover, in some approaches, a bulk structure may have feature sizes, inter-material pores 208, voids, etc. having an average diameter $p_m$ in a range of 100 μm to 1 millimeters (mm).

In one approach, the support material may be of monolithic form designed for optimal gas flow and low gas flow pressure drop. In other approaches, the support material may be a 3D structure with pre-defined geometry designed for optimal gas flow. In some approaches, the support material may be a 3D structure formed by methods such as use of a template, a mold, a cast, etc. The pores of the support material, e.g., intra-material pores, may be formed in part with a pore-forming agent, a binder, etc. as described herein.

In preferred approaches, the porosity of the 3D structure may be in a range of about 30% to 70%. In one approach, a specific surface area of the 3D structure may be in the range of 1 to 500 $m^2/g$ (meter squared per gram) and may be higher.

As illustrated in part (b) of FIG. 2, the 3D structure 202 of electrically conductive ceramic material 206 may be loaded, incorporated, etc. with a gas sorbent additive. In one approach, the gas sorbent additive may be an amine-containing sorbent additive 214. According to one embodiment, the porous sorbent ceramic product is a hybrid sorbent material (support+additive). In one approach, the porous sorbent ceramic product 200 includes an amine-containing sorbent additive 214 primarily present in the intra-material pores 212 of the conductive ceramic material 206 for sorption of a specific gas. In some approaches, the amount of amine-containing sorbent additive may be present in a range of greater than 20 wt. % to less than 70 wt. % of the combined weight of the amine-containing sorbent additive and the ceramic material.

Part (c) illustrates the hybrid sorbent material (support+additive) is contacted with a gas stream rich in a gas of interest to be selectively removed. For example, in one approach, an air stream that includes several gases and $CO_2$, e.g., a $CO_2$-rich air 216, may flow through the porous sorbent ceramic product 200. The sorbent selectively adsorbs some or all of the gas of interest from the gas stream. For example, an amine-containing sorbent additive 214, incorporated in the conductive ceramic material 206 adsorbs the $CO_2$ gas from ambient air 216 in direct air capture (DAC). The air stream now depleted substantially of $CO_2$, e.g., $CO_2$-lean air 218, continues to flow out of the 3D structure 202. Typically, the $CO_2$-lean air has a reduced $CO_2$ content compared to the incoming $CO_2$-rich air. In some cases, desorption flow may generally occur in the physical opposite direction as the direction of adsorption flow.

As illustrated in part (d) of FIG. 2, the porous sorbent ceramic product 200 may include at least two electrodes 220a, 220b in electrical communication with the ceramic material, where each electrode 220a, 220b is positioned on opposing sides of the ceramic material. The electrodes 220a, 220b are present for applying a current 222 across the ceramic material 206 of the 3D structure 202. In one approach, the opposing electrodes may comprise of a conductive material that is different than the conductive ceramic material. In various approaches, the electrodes may be comprised of any suitable material, such as metal, metal alloy, conductive polymer, or other conventional electrode material.

As shown in part (d), the incoming gas stream may be switched off, and the sorbent material may be regenerated by a process involving increased temperature. In one approach, the heating may include application of a vacuum, e.g., temperature vacuum swing adsorption. The sorbent is heated directly via joule heating with an applied current, and the elevated temperature and other effects, including applied vacuum or sweep gas, desorbs the bound gas and regenerates the sorbent. The joule heating allows the ceramic material to be evenly heated across the entire structure. Moreover, the heat may be localized to the ceramic material having the sorbent additive with adsorbed gas. The process of joule heating provides an efficient use of power through resistive heating and by more locally heating the material having the sorbent additive as opposed to conventional processes of heating the entire contactor apparatus.

Once the sorbent ceramic product is regenerated and adsorbed gas removed from the system, the cycle may repeat, (as shown in part (c)), in which the sorbent additive is exposed to a mixed gas stream for adsorption of a selective gas. In some approaches of the cyclic adsorption-regeneration process, the adsorbed gas may not be completely removed from the sorbent during regeneration. For example only, the cycling $CO_2$ loading range may be selected to maximize long-term performance and throughput, and often the process may involve incomplete removal of the adsorbed $CO_2$.

In various approaches, the 3D structure may be characterized as exhibiting sufficient joule heating upon application of an electrical current thereto to drive adsorbed gas from the sorbent additive. Application of a current 222 across the conductive ceramic material 206 via the electrodes 220a, 220b provides joule heating of the ceramic material 206 thereby causing the release of essentially pure $CO_2$ 224 that had been adsorbed to the amine-containing sorbent additive 214 incorporated in the ceramic material 206.

In various approaches, the 3D structure has the appropriate properties to provide the desired temperature for regeneration, without burning up, and without using so much current that the goals of greenhouse gas reduction were effectively nullified. In various approaches, the bulk properties of the 3D structure include the conductive ceramic material having a thermal conductivity in a range of 1 to 100 $W\ m^{-1}\ K^{-1}$ (Watts per meter-Kelvin) and may be higher depending on the ceramic material. In one approach, the conductive ceramic material has an electrical conductivity in a range of 1 to 1000 $\Omega^{-1}\ cm^{-1}$ (reciprocal ohm per centimeter) and may be higher, depending on the ceramic material. In preferred approaches, the thermal conductivity, electrical conductivity, etc. of the porous ceramic material is comparable to the theoretical thermal conductivity, electrical conductivity, etc., respectively, of the same ceramic material in a nonporous state, e.g., with essentially zero porosity.

The 3D structure of porous ceramic material may be used to incorporate, support, etc. an active gas sorbent additive. In various approaches, the sorbent additive may be one of the following: an organic molecule, an oligomer, a polymer, an aromatic polymer, a non-aromatic polymer, a co-polymer, etc. In some approaches, the sorbent additive may be an amine-containing sorbent additive. In other approaches, the sorbent additive may be a hydroxyl-containing resin. In another approach, the sorbent additive may be a carbonate-containing resin. In yet another approach, the sorbent additive may be a phosphate-containing resin.

In an exemplary approach, the sorbent additive may be an amine-containing sorbent additive, e.g., an amine-containing polymer-based material, optimized for $CO_2$ capture and direct air capture (DAC). The amine-containing sorbent additive may be comprised of a variety of basic, amine-containing molecules including organic molecules, oligomers, and/or polymers. In some approaches, aminopolymers may have a branched structure, a linear structure, a dendritic structure, structure, or a combination thereof. In exemplary approaches an aminopolymer may have molecular weights in a range of 100 to 100,000 daltons (Da).

A common commercially available aminopolymer effective for $CO_2$ adsorption, in particular DAC, is poly(ethylenimine) (PEI). PEI has been incorporated into a variety of support materials, including porous silicas, hollow fibers, porous organics, and hierarchical alumina monoliths. Many studies have investigated approaches to regeneration of these types of sorbents, including steam stripping, temperature and/or vacuum swing adsorption, and humidity swing adsorption, but the use of steam is typical in scaled technologies. Aminopolymers may be, but not limited to, poly (alkylamine), poly(ethylenimine), poly(allylamine), poly (vinylamine), poly(propylenimine), etc.

In some approaches, other aminopolymer structures may include linear, branched, or dendritic architectures. Aminopolymers may contain primary, secondary, and/or tertiary amines.

As described herein, the sorbent additive may be incorporated into the ceramic support material during or after the synthesis of the support material. The support may be loaded with the additive by means of physical incorporation, including dipping and drying or deposition. The porous sorbent ceramic product (e.g., support+additive) includes a gas sorbent additive, e.g., an amine-containing sorbent additive, in the range of 20 to 70 wt. % the total weight of the product.

Figure 3:
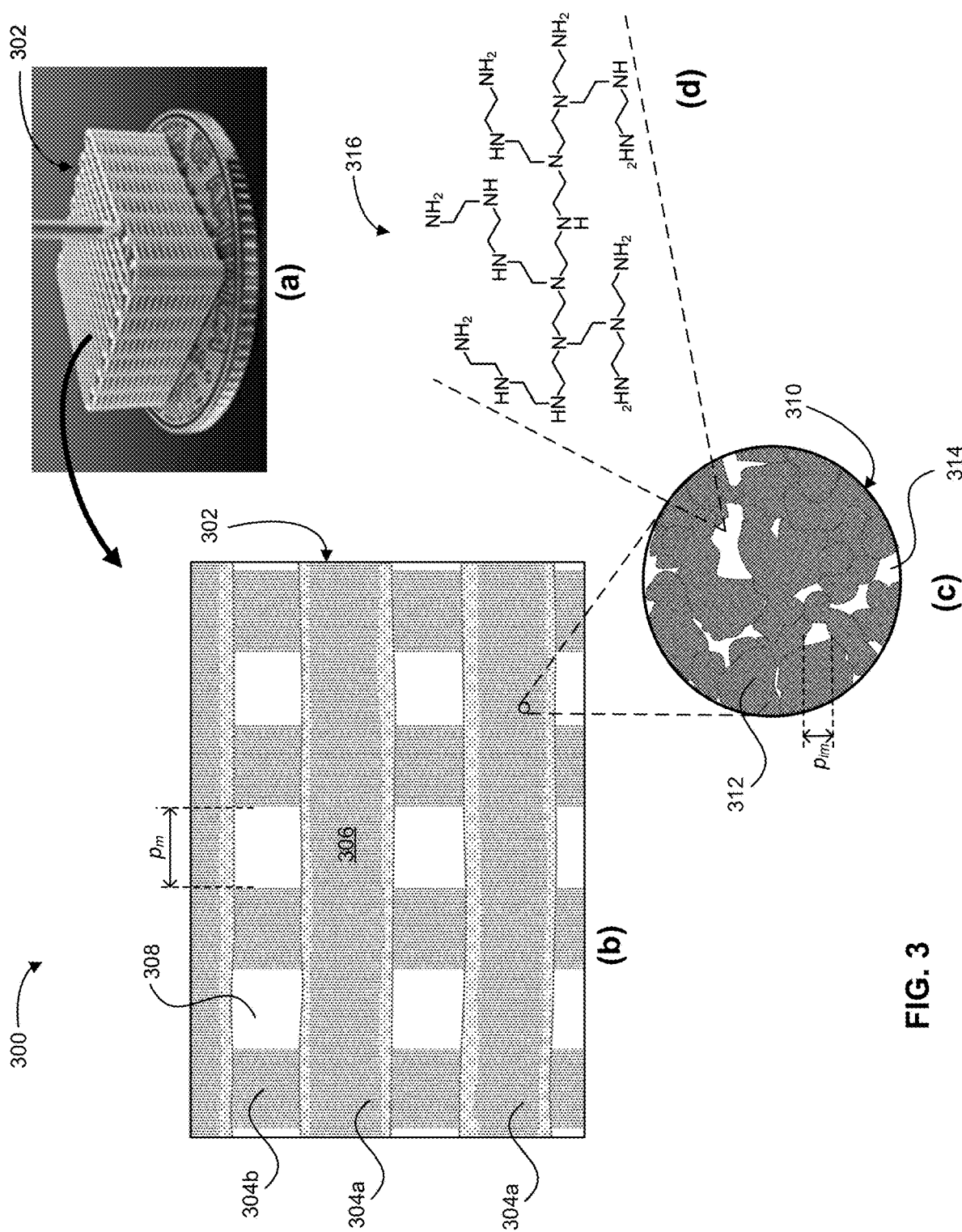
FIG. 3 is a schematic drawing of a porous ceramic support formed by additive manufacturing, according to one embodiment. Part (a) is a schematic drawing of an extrusion-based additive manufacturing technique, part (b) is a side view of a log-pile structure formed by extruding filaments of an ink, part (c) is a magnified view of a portion of the extruded filament, and part (d) is a schematic drawing of an amine-containing sorbent additive primarily present in the intra-material pores.

FIG. 3 depicts a schematic drawing of a porous sorbent ceramic product 300 formed by additive manufacturing, in accordance with one embodiment. As an option, the present product 300 may be implemented in conjunction with features from any other embodiment listed herein, such as those described with reference to the other FIGS. Of course, however, the product 300 and others presented herein may be used in various applications and/or in permutations which may or may not be specifically described in the illustrative embodiments listed herein. Further, the product 300 presented herein may be used in any desired environment.

According to one embodiment, the 3D structure of the porous sorbent ceramic product has physical characteristics of formation by additive manufacturing. The 3D structure may have a pre-defined geometric arrangement of features. In various approaches, the pre-defined arrangement of features include channels from one side of the 3D structure to the opposite side of the structure for efficient gas flow during adsorption, low pressure drop, etc.

In one approach, as illustrated in FIG. 3, a porous sorbent ceramic product 300 includes a 3D structure 302 formed by additive manufacturing. For example, as shown in part (a), a 3D structure 302 may be formed by extrusion-based techniques, e.g., direct ink writing. The 3D structure 302 may have a pre-defined geometric arrangement of features. For example, the extruded structure illustrated in part (a) is a log-pile structure. The porous sorbent ceramic product 300 may include a printed conductive ceramic 3D structure 302 having a plurality of layers in which each layer (e.g., a first layer, a second layer, a third layer, etc.) is formed from the at least one filament (e.g., strand, ligament, feature, etc.). In one approach, the filament may be a continuous filament forming all the layers of the structure.

In some approaches, the porous sorbent ceramic product may have hierarchical porosity such that the structure printed by additive manufacturing processes has an inter-material porosity (e.g., between the printed filament of material) and an intra-material porosity (e.g., within the material of the printed filament). Inter-material pores are defined as pores between two adjacent filaments. A structure is comprised of a plurality of filaments and the space between adjacent filaments of material is the inter-material space, void, etc. e.g., inter-material pores.

As illustrated in part (b), the top down view of the 3D structure 302 formed by DIW includes a pre-defined geometric arrangement of features, e.g., filaments, pores, etc. having an open cell structure and a plurality of pores through the 3D structure from one side of the structure to the other side of the structure. As shown, a series of filaments 304a, 304b printed from a substantially continuous filament form a first layer of filaments 304b and a second layer of filaments 304a. The pre-defined geometry of the 3D structure forms inter-material pore 308 (e.g., void, space, pore, etc.) between two adjacent filaments 304a, 304b. In preferred approaches, a plurality of inter-material pores 308 form continuous channels from one side of the structure 302 to the other side of the structure 302. The continuous channels encourage efficient flow for the passage of the mixture of gases through the porous sorbent ceramic product.

Intra-material pores are defined as pores within the associated filament. Each filament of a structure has intra-filament space comprised of material and pores, e.g., intra-material pores. For example, as illustrated in the expanded view of a portion of the ceramic material 306 in part (c), the intra-filament space 310 of the filament 304a includes partially sintered particles 312 of ceramic material and intra-material pores 314 defined by the space between the partially sintered particles 312.

In one approach, the printed filament may have intra-material porosity that is formed as a result of the additive manufacturing process or a post-printing treatment process. In one approach, the formation of the printed filaments from a composition of conductive ceramic material and a binder, pore-forming agent, etc. using an additive manufacturing process. A post-printing process for removing the binder, pore-forming agent, etc. allows the formation an intra-material pores. In various approaches, intra-material porosity includes pores having an average diameter smaller than the average diameter of the printed feature, filament, strand, etc. and smaller than the average diameter of the inter-material pores. The inter-material pore spaces may be systematically varied by the geometry, creating of hierarchy of porosity in inter-material spaces in addition to intra-material spaces.

In some approaches, inter-material pores 308, e.g., inter-filament pores, may have an average diameter $p_m$ in a range of greater than 10 μm to less than about 100 mm, preferably less than about 10 mm. In one approach, a size of the inter-material pores may be defined by the additive manufacturing technique. In some approaches, the intra-material pores 314 may have an average diameter $p_{im}$ in a range of greater than 0 nm to about 10 μm. In some approaches, the intra-material pores may have an average diameter $p_{im}$ in a range of greater than 0 nm to about 1000 nm and may be larger. In some approaches, tuning the intra-material pores may include a pre-defined passageway, roughness, etc. In preferred approaches, intra-material pores formed with sacrificial components, e.g., porogen, may have an average diameter greater than 0 nm to less than 100 nm. In one approach, a size of the intra-material pores may be defined by the particle size and quantity of the binder, pore-forming agent, etc.

The porous sorbent ceramic product 300 includes a conductive ceramic material 306 and an amine-containing sorbent additive 314. As illustrated in part (c), a magnified view of the intra-filament space 310 from a portion of the filament 304a, an amine-containing sorbent additive is primarily present in the intra-material pores 314. In one exemplary approach, as illustrated in part (d), the amine-containing sorbent additive may be poly(ethylenimine) (PEI) 316.

In some approaches, the porous sorbent ceramic product forms an electrical circuit in the conductive ceramic material capable of resistive heating upon application of an electrical current. For example, the conductive ceramic material has a sufficient electrical conductivity to provide electrical conduction to provide resistive heating. A mixture of gases, e.g., ambient air, flue gas, etc. may be passed across and/or through the continuous channels having a sorbent additive present in the ceramic material of the adjacent filaments forming the continuous channels.

Figure 4:
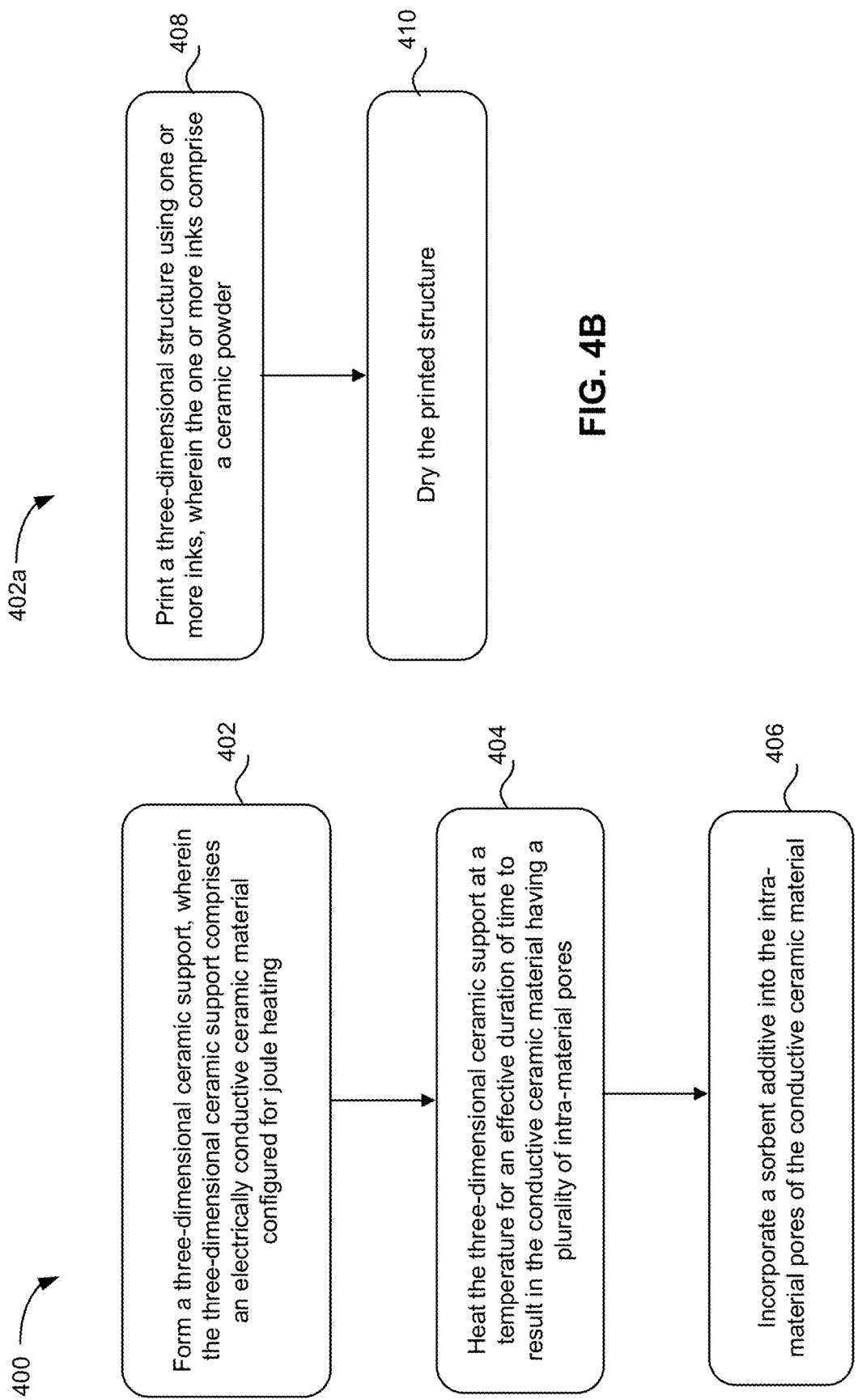
FIG. 4A is a flow chart of a method of forming a product for separating gases, according to one embodiment.
FIG. 4B is a flow chart of a method of forming a three-dimensional ceramic support using additive manufacturing, according to one embodiment.

FIGS. 4A-4B show a method 400 for forming a product for adsorption of a selective gas, in accordance with various aspects of one embodiment. As an option, the present method 400 may be implemented to construct structures such as those shown in the other FIGS. described herein. Of course, however, this method 400 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIGS. 4A-4B may be included in method 400, according to various embodiments. It should also be noted that any of the aforementioned features may be used in any of the embodiments described in accordance with the various methods.

According to a general embodiment as illustrated in the flow chart of FIG. 4A, method 400 includes operation 402 of forming a 3D ceramic support, wherein the 3D ceramic support includes an electrically conductive ceramic material configured for joule heating. In one approach, the 3D structure may be formed using a mold, template, cast, etc. In other approaches, the 3D structure may be formed by an additive manufacturing process of forming a monolith, a bulk structure, etc. In one approach, an additive manufacturing process may include powder bed methods where the shape is formed by one of the following: selective deposition and curing of binders followed by subsequent de-binding and partial sintering, consolidation processes, etc. In one approach, an additive manufacturing process may include jetting of an ink having ceramic precursors that may be dried, cured etc. before depositing additional material followed by subsequent de-binding and sintering. In yet another approach, an additive manufacturing process may include extrusion of an ink such as direct ink writing.

According to various embodiments described herein, the 3D ceramic support may include semiconducting materials commonly used in conventional resistive heating elements. In some approaches, the conductive ceramic material may include a metal carbide, a metalloid carbide (e.g., silicon carbide (SiC), etc.), a metal boride, a metalloid boride, a metal nitride, a metalloid nitride (e.g., silicon nitride ($Si_3N_4$), etc.), a metal oxide, a metalloid oxide, a metal silicide, and/or other materials that would become apparent to one skilled in the art upon reading the present disclosure. For example, in some approaches, the ceramic material may include SiC, SiOC, SiCN, $MoSi_2$, $Si_xN_y$, $B_xC$, BN, BCN, AlN, etc. In some approaches, the conductive ceramic material of the resistive heating element may include a combination of electrically conductive ceramic materials, electrically insulating ceramic materials, etc. Preferably, the conductive ceramic material is stable against degradation at high temperature in a steam/reducing environment of the reactor. In various approaches, the conductive ceramic material may include one or more of the following: SiC, $MoSi_2$, $ZrB_2$, $CeO_2$, etc.

In other approaches, the conductive ceramic material may include electrically conductive transition metal compounds. In some approaches, a metal additive may be present to tune conductivity in the ceramic material. The electrical conductivity may be present in the conductive ceramic material in the form of electrons, electron holes, a result of ionic conductivity, or a combination thereof. For example, the conductive ceramic material may include at least one of the following: a transition metal carbide, a transition metal boride, a transition metal nitride, a transition metal silicide, etc.

In various approaches, formation of the conductive ceramic support may be tuned to the desired specific gas for adsorption.

In some approaches of operation 402, the conductive ceramic support may be formed via a variety of techniques utilizing at least one of the following: preceramic polymers, ceramic powders, etc. including partial sintering, replica or sacrificial templating, direct foaming, bonding, aerogel formation, freeze-casting, or others. For example, direct foaming may include forming an emulsion of a suspension of ceramic particles, and the air bubbles formed in the emulsion generate a porosity in the ceramic material of the structure formed with the emulsion.

In various approaches, operation 402 of forming a 3D conductive ceramic support includes using additive manufacturing techniques, at least in part, for forming a 3D structure (e.g., 3D printing). Such additive manufacturing techniques include an extrusion-based technique (e.g., direct ink writing (DIW), a powder bed-based technique (e.g., binder jetting, etc.), a material jetting technique, a sheet lamination technique, an electrostatic deposition technique, a laser fusion technique, a mold, a template (e.g., hard templates, soft templates, etc.), etc. In some approaches, forming the 3D conductive ceramic support may be highly scalable using AM techniques.

In various approaches, the formed 3D structure has physical characteristics of formation by an additive manufacturing technique. In various approaches, physical characteristics may include filaments arranged in a geometric pattern, a patterned outer surface defined by stacking filaments, a defined porosity (e.g., ordered, controlled, non-random, etc.), a porosity having pores with measurable average diameters, an outer surface and/or embedded surface having ridges and/or channels characteristic of a structure formed from printed filaments, etc. Thus, using these additive manufacturing techniques allows engineering of parts and production of optimal geometry for efficient mass transport and mechanical strength.

In some approaches, 3D printing of an ink allows extrusion of a bulk material to print struts in desired geometric patterns. The forming a 3D printed structure may include extruding a mixture of conductive ceramic material as an ink through the nozzle during direct ink writing processes, drying and/or curing the 3D structure and partially sintering the cured 3D structure.

Additive Manufacturing with Preceramic Polymer

According to one approach, a conductive ceramic support may be formed using preceramic polymers. Forming a ceramic material using preceramic polymers includes formation of a structure with a suspension, formulation, etc. of a preceramic polymer using a template, structure-directing agent, mold, cast, etc. In various approaches, a preceramic polymer may be templated to form a microstructure and/or may be molded, formed, printed to form a macrostructure. In one approach, a preceramic polymer may form a porous ceramic material using a template that forms microstructural porosity. For example, a preceramic polymer forms a microstructure having a pores available for incorporating a sorbent additive. In addition, or alternatively, in one approach, a preceramic polymer may be used to form the 3D structure of the ceramic support, e.g., a macrostructure, by using a mold, cast, form with a formulation of a preceramic polymer.

The preceramic polymers may be used as a slurry of preceramic polymer material suspended in a solvent for forming a shaped structure. In other approaches, a slurry of preceramic polymer may be used as an ink in extrusion-based printing as described herein. The form of the preceramic polymer suspension, formulation, etc. may be pyrolyzed to convert the polymer into a ceramic material.

In various approaches, preceramic polymers may include polymers that form ceramic material following pyrolysis. Exemplary families of preceramic polymers include poly (carbosilane), poly(methylsilane), poly(siloxane), poly(silazane), poly(borazine), poly(aluminum amide), etc.

In some approaches of forming a structure with a preceramic polymer, a filler additive may be included with the preceramic polymer as a reinforcing additive. The concentration of filler may be present in an effective amount for tuning the stiffness of the structure to a predefined extent. In another approach of forming a structure with a preceramic polymer, a filler additive may be included as a structure-directing agent. The concentration of the filler additive may be present in an effective amount for forming a microstructure to a predefined extent. In various approaches, the concentration of filler additive may be determined by the type of filler included in the mixture. In one approach, the filler additive may be removed during post-printing treatment.

In some approaches, the 3D printed structure using preceramic polymers is cured following the printing step to crosslink monomers, oligomers, polymers, and/or a combination thereof. In various approaches, the curing step may be tuned according to the binder included in the ink. In various approaches, the type of binder material may include one or more of the following: a thermal curing binder, e.g., phenolic reaction compounds; a chemical curing binding, e.g., epoxies; UV curing binders, e.g., acrylates; non-ionic surfactants, e.g., poly(ethyleneglycol)-block-poly(propyleneglycol); polyethylenimine; polyvinyl alcohol; polyvinylpyrrolidone; waxes; and a large variety of binders for powder processing compatible with aqueous or non-aqueous processing, etc.

In one approach of method 400, operation 404 includes heating the 3D ceramic support at a temperature for an effective duration of time to result in the conductive material having a plurality of intra-material pores. In one preferred approach, the shaped form of preceramic polymer being the 3D ceramic support may be heated above 800° C. to convert the preceramic polymer into the ceramic material and form the intra-material pores of the ceramic material. In ceramic material derived from preceramic polymers, the polymer may be shaped and converted into a ceramic component through pyrolysis at suitable temperatures (generally >800° C.). In some approaches, following formation of a structure, the material may be crosslinked, gelled, etc. The preceramic polymer may be soft- or hard-templated (shaped), and this preceramic formulation could be formed, molded, etc. into a 3D form before pyrolysis. The ceramic inorganic material results from the elimination of organic moieties during pyrolysis, e.g., by breaking of C—H bonds with release of $H_2$, $CH_4$, other volatile compounds, etc. The ceramic material forms through a complex evolution of the microstructure that may be tuned by the thermal conditions, final heating temperature, etc. In approaches in which the shape of the structure is formed using a template, the template may be removed by high temperature heating, dissolution in solvent, etching the template, etc.

In preferred approaches, the heating of the 3D ceramic support, e.g., the pyrolysis of the preceramic polymer formulation, imparts a desired porosity of the ceramic material having intra-material pores for the incorporation of a sorbent additive. In an exemplary approach, the 3D ceramic support is heated until the ceramic material has a porosity in a range of about 25% to about 70%. The material has a porosity and an interior volume available for incorporating the sorbent additive.

Additive Manufacturing with Ceramic Powder

According to one approach, a conductive ceramic structure may be formed with ceramic material in powder form. A powder of conductive ceramic material is comprised of ceramic particles. These powders may be partially densified, e.g., partially sintered, to provide sufficient electrical conductivity while increasing the surface area on a bulk volume basis. Methods to partially densify the powder may incorporate pressure-assisted sintering, additive-assisted sintering, etc. In some approaches, partially densified powder material may reduce the economic cost (time, temperature, etc.) for the fabrication of the electrically heated ceramic material. In some approaches, the ceramic particles may have an average diameter in a range of about 10 nanometers (nm) to about 50 microns (μm). In preferred approaches, the ceramic particles may have an average diameter in a range of about 100 nm to 25 μm. In one approach, the powder of conductive ceramic material may include large ceramic particles in a mixture with smaller ceramic particles for various packing density advantages. The ceramic powders having different particle sizes may be obtained commercially.

In some approaches, ceramic powders having a particle diameter in the nanoscale range, e.g., greater than 100 nm to less than 900 nm, are preferred for forming a higher surface area of partially sintered particles within the material. The higher surface area per mass of the material is preferred for providing better distribution of the sorbent additive throughout the intra-material pores of the material. In contrast, larger particles, e.g., in the micron range generate larger pores within the material and not necessarily larger surface area.

In one approach, the conductive ceramic material may include oxide particles, e.g., cerium oxide particles, etc. In one approach, the particle size of the conductive ceramic material may be tailored to optimize the reactivity of the resistive heating element, e.g., roughness, surface area, etc.

In preferred approaches, the conductive ceramic material may be amenable to a powder-based additive manufacturing process. In one approach, the conductive ceramic material has a high surface area for dispersing, incorporating, etc. the sorbent additive. The conductive ceramic material provides a support for the sorbent additive for optimizing the contacting between the selected gas and the sorbent additive.

One approach of operation 402 is shown in sub-method 402a in FIG. 4B of forming a 3D ceramic support using additive manufacturing. In one approach, operation 408 includes printing a 3D structure using one or more inks, where the inks include a ceramic powder. For example, the additive manufacturing technique may include extrusion of an ink, paste, etc. to write a filament followed by subsequent sintering.

In preferred approaches, for forming the 3D structure by DIW, an ink may include a slurry comprising a ceramic powder suspended in a solvent. The ceramic powder may be comprised of ceramic particles having an average diameter in a range of nanometers to microns, e.g., between 100 nm to about 10 μm. The ceramic particles may be present in a range of about 40 to 50 vol. % of the total slurry and may be higher or lower. In one approach, the ceramic particles may be suspended in water.

In some approaches, an additive or additives may be added to the slurry to improve the stability of the slurry. For example, additives may include at least one of the following: surfactants (e.g., Pluronic F127), dispersants (e.g., acids such as acetic acid, charged polymers such as PEI), binders, etc. Additives may be added to the slurry to adjust the viscosity for additive manufacturing, e.g., direct ink writing. For example, Pluronic F127 may be included as a surfactant but functionally performs as a viscosity modifier to optimize the rheological properties of the ink. A surfactant may be present in the slurry in an amount of about 5 wt. % of the ceramic powder in the slurry.

In some approaches, the filler additive may include a reinforcing filler to provide durability to the green body of the printed structure. Exemplary fillers include fumed silicas, precipitated silicas, diatomaceous earth, calcium carbonate, metal carbides, metal borides, etc.

In one approach, the printing may include a mixed ink, where the components of the ink, e.g., the conductive ceramic material, etc., are mixed before the printing of the resistive heating element. In various approaches, the mixture may be combined at room temperature. In some instances, temperature may vary as determined by the component of the mixture as generally understood by one skilled in the art.

In some approaches, the ink is extruded from a nozzle having a defined diameter. Diameters of nozzles used in extrusion-based printing may range from greater than 50 µm up to 1000 µm, and diameters may be smaller or larger depending on the availability of nozzles with specific diameters. In some approaches described herein forming a sorbent structure may include using nozzles having a diameter of 200 µm, 400 µm, etc. for extruding a filament having an average diameter of 200 µm, 400 µm, etc. The size of the extruded filament may be defined by the diameter of the nozzle of the DIW apparatus.

In one approach, the components of the ink may be mixed in the nozzle, optionally with assistance from a mixer, as the ink is being extruded from the nozzle. For example, in one approach, a gradient may be created in the density, amount, etc. of second component along one or more dimensions of the structure. The mixer rate of the ink in a mixing system may be defined as the rate of mixing the ink in a nozzle, cartridge, etc. prior to extruding the ink to a substrate. The rate is measured in revolutions per minute of a paddle, impeller, stirring rod, etc. In one approach, selecting a mixer rate for setting a porosity includes determining the viscosity of the ink, parts of ink, etc.

In another approach, two separate inks are prepared, and then the two inks are co-extruded during the printing of the resistive heating element. In yet another approach, two separate inks are prepared, and then the first ink comprising the conductive ceramic material is extruded to print the resistive heating element, followed by printing the second ink comprising a second component (or vice versa).

Referring to FIG. 4B, following printing the 3D structure of operation 408, operation 410 includes drying the printed structure (i.e., the green body) of ceramic material to remove residual solution from the ink. In some approaches, the printed structure may be dried in an oven for about 8 hours to about 20 hours until the solvent of the slurry is evaporated from the structure.

Referring to FIG. 4A, in one approach of method 400, operation 404 includes heating the 3D ceramic support at a temperature for an effective duration of time to result in the conductive ceramic material having a plurality of intra-material pores. The dried printed 3D structure of ceramic material is heated for an effective duration of time to result in a partially sintered ceramic material that includes a plurality of intra-material pores. In some approaches, the heating of the 3D structure may include two heating steps. In various approaches, the 3D structure may be de-binded and partially sintered. De-binding and partial sintering may occur as separate thermal treatments, in a combined thermal treatment, etc. De-binding typically occurs at temperatures ranging from 200 to 1000° C. for decomposing polymers, removing polymers, etc. from the structure. In some approaches, a first heating step may include heating the structure to a temperature above 1000° C., e.g., about of about 1050° C., for about an hour to burn away the organic material from the structure.

A second heating step including heating the structure to about 1800° C. for a duration of time, e.g., 2-4 hours, to partially sinter the particles in the material of the 3D structure. In some approaches, partial sintering may occur at temperatures above 1000° C., and as high as 2200° C., in inert gas environments (e.g., nitrogen, argon, helium, etc.), reducing gas environments (e.g., forming gas, hydrogen, etc.), oxidizing gas environments (e.g., carbon dioxide, air, oxygen, etc.), or other reactive gas environments (e.g., ammonia, etc.). Temperature and duration of de-binding and partial sintering may vary for different compositions of materials based on the temperature preferred to form desired porosity of the material.

Preferably, the heating of the structure does not fully sinter the material of the 3D structure. For example, for the purposes of this disclosure, an undesirable fully sintered ceramic material has substantially collapsed pores and forms a solid mass with essentially zero porosity. In preferred approaches, a partial sintering of the ceramic material imparts a desired porosity of the ceramic material having intra-material pores for the incorporation of a sorbent additive. In an exemplary approach, the dried printed structure is partially sintered until the ceramic material has a porosity in a range of about 25% to about 70%. The material has a porosity and an interior volume available for incorporating the sorbent additive.

In some approaches, an additive may be included in the ink for improving the rate of sintering of the formed structure. For example, an ink may include at least one of the following: metal oxides, such as $Al_2O_3$, $Y_2O_3$, etc.; salts, such as $Al(NO_3)_3$, $Y(NO_3)_3$, etc. In some approaches, an additive may be included in the ink for increasing the conductivity of the material. For example, an ink may include a carbon additive, etc. In some approaches, during the heating step, an increased pressure may be applied for improving the rate of sintering. For example, in one approach of the heating step, hot pressing may be applied up to tens of megapascals.

In one approach, the electrical conductivity and thermal conductivity of the ceramic material of the sorbent support (e.g., support, substrate, etc.) may be tailored for a desired application. In one approach, a composition of the conductive ceramic material may be tailored for the pre-defined temperature of a desired temperature for regeneration of adsorbed gas.

In one approach, a structure may be fabricated with ceramic materials and then the ceramic materials of the structure may be converted to have a resistive heating property using reactive sintering techniques. For example, structure may be fabricated with $ZrO_2$, and then the fabricated $ZrO_2$ structure is reduced and reacted with a boron (B) source to convert the fabricated structure material into $ZrB_2$. For example, $ZrO_2$ may be reacted with $B_4C$ to form $ZrB_2$ composites. In another example, $ZrO_2$ may be reduced by carbothermal reduction using C and then reacted with B to form $ZrB_2$. In another example, $ZrO_2$ may be reduced by borothermal reduction and then reacted with B to form $ZrB_2$. In another example, $ZrO_2$ may be reduce by magnesiothermic reduction and then reacted with B to form $ZrB_2$. In another example, Zr metal may be reacted with B. In another example, combinations of these reaction approaches may be conducted.

Following formation of a 3D ceramic support, operation 406 includes incorporating a sorbent additive into pores of the conductive ceramic material. As described herein, the 3D ceramic support may be formed using a preceramic polymer, a ceramic powder, etc. In one approach, operation 406 of incorporating the sorbent additive into the ceramic material may include a dip and dry method of adding the sorbent. For example, the method may include immersing the 3D structure, e.g., ceramic support, in a mixture of the sorbent additive suspended in a volatile hydrophilic solvent (e.g., methanol, ethanol, etc.), and then drying the structure to remove the solvent by evaporation. In some approaches, the evaporation of the solvent may include applying heat and/or vacuum. In another approach, the sorbent additive may be added to the conductive ceramic support by a chemical functionalization of chemically binding the sorbent additive to the ceramic material.

Following removal of the solvent, the sorbent additive remains within the pores of the ceramic material. In some approaches, the sorbent additive may be retained in the intra-material pores of the ceramic material by capillary action, etc. Without wishing to be bound by any theory, it is believed that the sorbent does not interact strongly with the surfaces within the pores since ceramic tends to be relatively inert having a low level of intermolecular forces. In so doing, the sorbent molecules are available for adsorption of molecules of the selective gas without interference from the ceramic material. For example, in an exemplary approach, amine-containing sorbent molecules are available for adsorption of molecules of $CO_2$ without interference from the ceramic material.

The sorbent is a substance that has the property of collecting gas molecule by sorption, e.g., the mechanism of sorption may include absorption, adsorption, or both. As described herein, the amine-containing sorbent additive may include an aliphatic structure of an amine-containing molecule. In other approaches, the amine-containing sorbent additive may include an aromatic structure of an amine-containing molecule, polymer, etc. In preferred approaches, the amine-containing sorbent additive includes at least two carbon atoms separating the amine groups within each molecule. The amine-containing sorbent additive molecules may have a structure including: a branched structure, a linear structure, a dendritic structure, etc. In some approaches, the amine-containing sorbent additive may be one of the following: an organic molecule, an oligomer, a polymer, etc. For example, exemplary examples of the amine-containing sorbent additive may include poly(alkylamine), poly(ethylenimine), poly(propylenimine), poly(allylamine), poly(vinylamine), a combination thereof, etc.

In preferred approaches, the amount of amine-containing sorbent additive present in the ceramic support may be in a range of about 20 wt. % to about 70 wt. % of combined weight of the amine-containing sorbent additive and the ceramic material support.

In some approaches, after multiple uses, the sorbent additive may be replaced from the pores of the ceramic material support. For example, after an extended duration of use, the original sorbent additive may not adsorb the selective gas as efficiently, then a solvent may be used to rinse the original sorbent additive from the ceramic support and then new, unused sorbent additive may be added to the pores of the ceramic support for an extended duration of time. The advantages to this process include preserving the 3D structure of conductive ceramic material and avoiding having to make a new ceramic support after multiple uses of a sorbent.

In some approaches, where formation of the 3D structure does not include a heating temperature above 100° C., a sorbent additive may be included during the formation of the 3D structure. For example, a sorbent additive may be included as a component in an ink with the ceramic, metal, metal-doped material, etc. ink for forming the 3D structure, included as a second ink to be mixed with a first ink comprising the ceramic, metal, etc. for formation of a 3D structure.

In some approaches, at least two electrodes may be added to the 3D ceramic sorbent support after the operation 406 of incorporating the sorbent additive to the support. In other approaches, the electrodes may be added to the 3D ceramic sorbent support before operation 406 of incorporating the sorbent additive. The electrodes are in electrical communication with the ceramic material and preferably are positioned on either side of the 3D ceramic support. In exemplary approaches, dense areas at the ends of the ceramic support are designated for the electrodes. The electrodes may be formed as a layer on the 3D structure, preformed and adhered to the 3D structure via any suitable technique such as conductive adhesive, etc. An electrode layer may be added by any suitable technique, such as by printing the layer (e.g., as part of the AM process that forms the 3D structure), sputtering, plating (since the 3D structure is electrically conductive), painting, dip coating, etc. In one approach, electrodes may be positioned by soldering, or other methods to attach electrodes generally understood by one skilled in the art.

Figure 5:
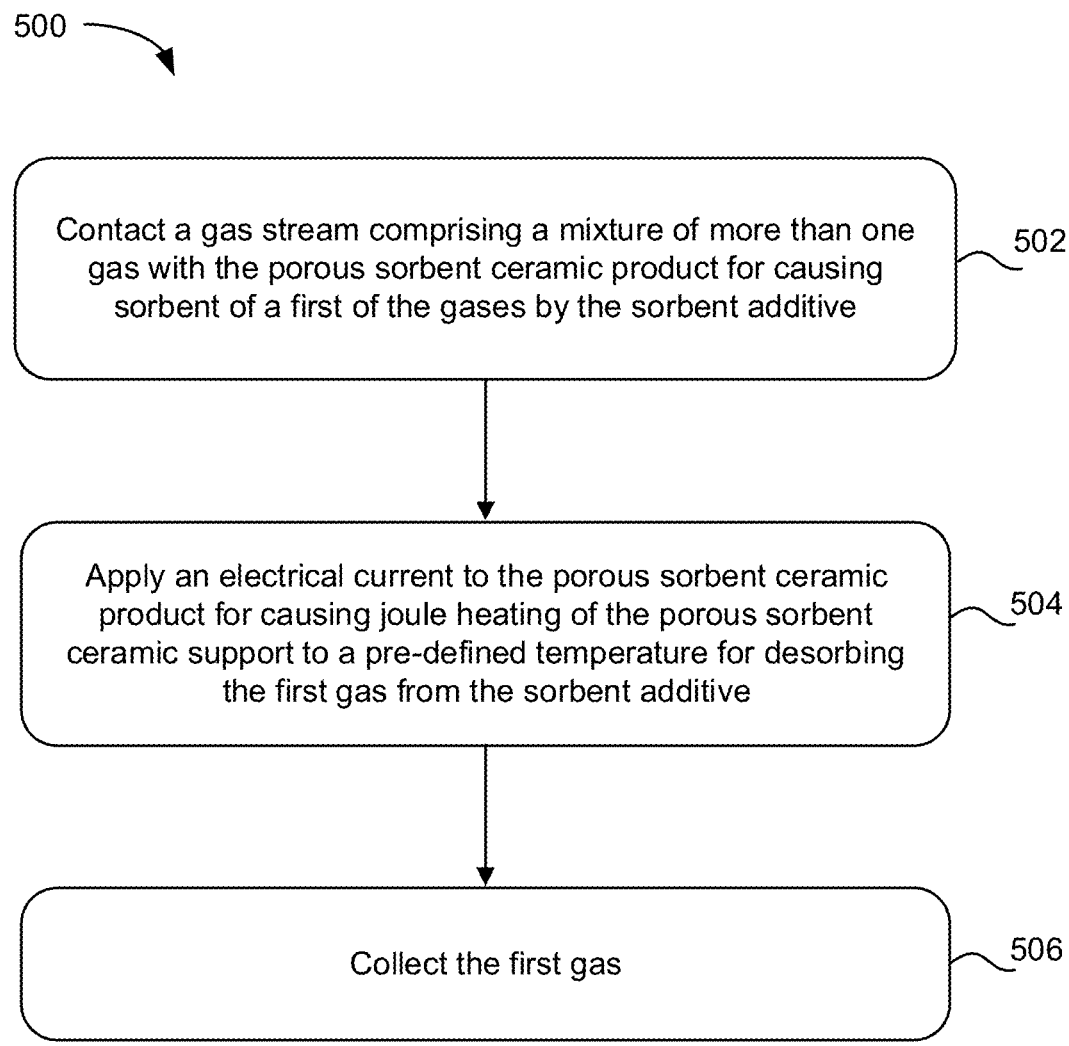
FIG. 5 is a flow chart of a method of using a porous sorbent ceramic product for separating gases, according to one embodiment.

FIG. 5 shows a method 500 for using a porous sorbent ceramic product having a sorbent additive for separating gases, in accordance with one embodiment. As an option, the present method 500 may be implemented to construct structures such as those shown in the other FIGS. described herein. Of course, however, this method 500 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 5 may be included in method 500, according to various embodiments. It should also be noted that any of the aforementioned features may be used in any of the embodiments described in accordance with the various methods.

Operation 502 includes contacting a gas stream that includes a mixture of more than one gas with the porous sorbent ceramic product for causing sorption of a selected gas from the gas stream by the sorbent additive. In various approaches, the sorbent additive may be one of the following: an organic molecule, an oligomer, a polymer, an aromatic polymer (e.g., poly(styrene), poly(divinylbenzene), etc.), a non-aromatic polymer (e.g., poly(acrylonitrile), etc.), a co-polymer, etc. In some approaches, the sorbent additive may be a resin. In some approaches, the sorbent additive may be an amine-containing sorbent additive. In exemplary approaches, the sorbent additive may be an amine-containing sorbent additive for selectively adsorbing $CO_2$ from a gas stream.

In various approaches, the sorbent additive may include a moisture-swing sorbent, for example, an ion-exchange resin. In some approaches, the sorbent additive may be a hydroxyl-containing sorbent additive. In another approach, the sorbent additive may be a carbonate-containing sorbent additive. In yet another approach, the sorbent additive may be a phosphate-containing sorbent additive.

In yet other approaches, the sorbent additive may be a combination of sorbent additives. For example, the sorbent additive may include an amine-containing sorbent additive and a hydroxyl-containing resin, or an amine-containing sorbent additive and a carboxyl-containing resin, etc. In some approaches, the sorbent additive may include multiple additives of the same class, e.g., more than one different amine-containing additive.

In one approach, the gas stream that includes a mixture of gases may be a flue gas. In another approach, the gas stream may be ambient air. In yet another approach, the gas stream may include biogas. In another approach, the gas stream may include fermenter-off gas. In some approaches, there may be a combination of gas streams, a mixture of gas streams, etc. These are examples of gas streams having a mixture of gases or gas components, but any gas stream may be used to selectively adsorbed a specific gas from a gas stream. In some approaches, the gas stream may include volatile organic compounds as minor components. The sorbent additive is a substance that has the property of collecting gas molecules by sorption, e.g., by a mechanism of absorption, adsorption, or both.

Direct air capture is the removal of $CO_2$ from ambient air. As described herein, an exemplary approach includes removing $CO_2$ from an air stream. In other applications, removal of acid gases is preferred from flue gas, biogas, other off-gas streams (e.g., other combustion, biological processes, etc.) which contain problematic quantities of acid gases. In some approaches, acid gases other than $CO_2$ may be removed from a gas stream, e.g., before removal of $CO_2$, in order to avoid poisoning, contamination, degradation, etc. of downstream processes or inadmissible emissions. For example, removal of $H_2S$ may be removed from flue gas streams before a $CO_2$ separation step.

In preferred approaches, a porous sorbent ceramic structure having an amine-containing sorbent additive that absorbs acid gases such as $CO_2$, $H_2S$, $SO_x$, $NO_x$, where x indicates different levels of oxygen, etc. from ambient air. In an exemplary approach of direct air capture, a porous sorbent ceramic structure having an amine-containing sorbent additive preferably adsorbs and removes $CO_2$ from ambient air. For example, air is a mixture of nitrogen, oxygen, argon, helium, $CO_2$, etc. and the porous sorbent ceramic structure having an amine containing sorbent additive may selectively adsorb $CO_2$ from the air stream contacting the porous sorbent ceramic structure.

In various approaches, the temperature of the process of contacting a gas stream with the porous sorbent ceramic product may be approximately ambient conditions. In some approaches, the temperature of the contacting may be approaching ambient conditions after being released from a source, e.g., flue gas. In preferred approaches, the porous sorbent ceramic product may function at an ambient temperature consistent with the flow of the gas stream. For example, during direct air capture processes using the porous sorbent ceramic structure, the temperature during the capture process may be rapidly cooled due to the high flow rates of the gas stream through the porous sorbent ceramic structure. The capturing process, e.g., adsorption of the gas molecule to the amine-containing sorbent, is an exothermic process, so heat is released as the amine-containing sorbent molecule captures the gas molecule. In some approaches, for additional process control, the temperature may be maintained at least at a given temperature, e.g., 25° C., 30° C., etc. Some gas streams (e.g., adsorbing from flue gas,) may flow through the porous sorbent ceramic structure at temperatures slightly elevated above room temperature, e.g., 25° C. to 30° C.

Operation 504 includes applying an electrical current to the porous sorbent ceramic product for causing joule heating of the porous sorbent ceramic support to a pre-defined temperature for desorbing the first gas from the sorbent additive. The porous ceramic sorbent support is conductive and thus exhibits joule heating upon application of an electrical current to the support. The application of electrical current may include direct current (DC) or alternating current (AC). In preferred approaches, an alternating current may be applied.

The pre-defined temperature may be in a range of greater than ambient temperature to about 120° C. but may be higher or lower. The pre-defined temperature may be an effective temperature for a desorbing a desired gas from the sorbent. In various approaches, the temperature may be defined by the specific interaction between the adsorbed gas and the sorbent, the reaction conditions, etc. The level of current to apply to the conductive ceramic material may be predetermined, adjusted periodically and/or in real time based at least in part on a temperature sensor reading, a chemical sensor reading, etc. contacting the one or more gases with the sorbent additive for causing a reaction to adsorb the gas to the sorbent additive, etc. In one approach, a specific gas for adsorption may be $CO_2$. In another approach, the specific gas for adsorption to the sorbent may include one or more of the following gases: $H_2$, $CH_4$, $H_2S$, $SO_x$, $NO_x$, etc. Preferably, porous sorbent ceramic structures having an amine-containing sorbent may adsorb specific acid gases such as $CO_2$, $H_2S$, $SO_x$, $NO_x$, etc.

In some approaches, a vacuum may be applied during the joule heating of the porous sorbent ceramic product for assisting in desorption of the selective gas from the amine-containing sorbent additive. In one approach, the vacuum will aid in removing the released gas molecules from the system which further drives desorption.

In some approaches, application of a sweep gas may assist in desorbing the gas molecules from the sorbent. In some approaches, a partial vacuum is applied with the sweep gas for removing the desorbed gas molecules from the system. An exemplary sweep gas may include $CO_2$ in order to avoid diluting the desorbed $CO_2$.

For some selective gases, a humid environment may assist in desorbing the gas molecule from a sorbent.

An optional operation 506 includes collecting the desorbed gas released from the sorbent additive after joule heating the 3D structure of conductive ceramic material. In some approaches, the collecting at least one product may include collecting a gas product. Preferably, the collection of a gas product, e.g., $CO_2$, may include subsequent compression of an essentially pure gas. In some approaches, $CO_2$ may be compressed to a high pressure gas, a liquid state, etc. In one approach, the collection of the gas may include drying the gas.

Experiments

Formation of a porous sorbent ceramic structure included preparation of an ink having a suspension of SiC particles (US Research Nanomaterials, Inc. Houston, TX) in water and the addition of a small quantity of additives to maintain a stable aqueous suspension and the appropriate rheological properties from DIW printing. A high molecular weight PEI was added to the ink as a stabilizing additive. A green body was printed by extrusion of the ink using a DIW technique. Following a drying step, the dried green body comprised non-densely held SiC particles with the additives, PEI and Pluronic F-127 (Millipore Sigma, St. Louis, MO) as a 3D structure. A partial sintering step included removing the PEI and Pluronic additives from the SiC material.

Figure 6:
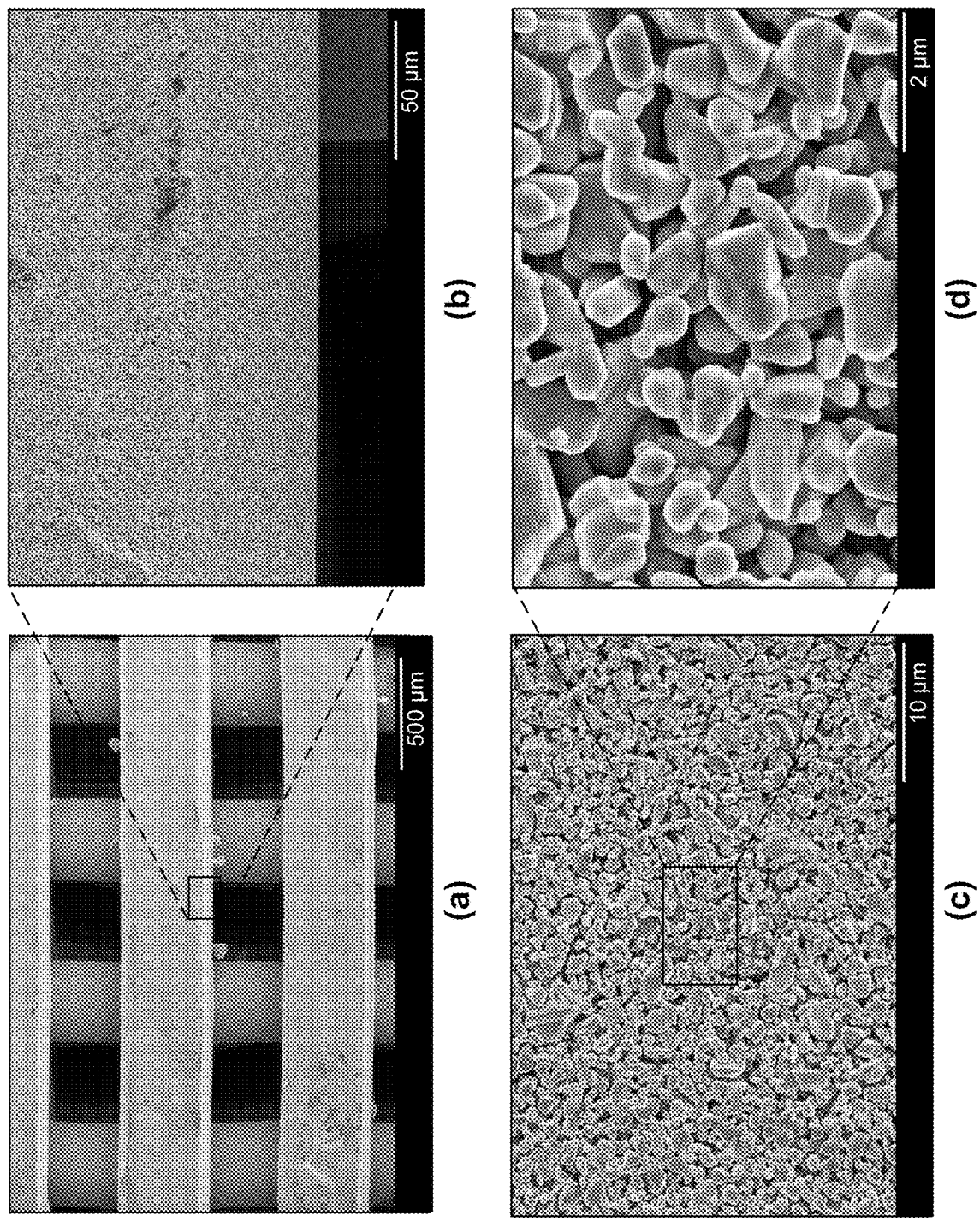
FIG. 6 depicts a series of images of a partially sintered SiC material, 3D printed by direct ink writing into a lattice, according to one embodiment. Part (a) is an 80× magnification of the lattice structure, part (b) is a magnification of a portion of the field of part (a). Part (c) is a 25,000× magnification of the material showing the microstructure of the porous partially sintered SiC material, and part (d) is a magnification of a portion of the field of part (c).

FIG. 6 depicts a series of scanning electron microscope (SEM) images of a porous ceramic 3D structure formed as a lattice by DIW. The structure was formed with an ink having 45 vol. % 2 μm SiC particles. The formed 3D structure was partially sintered under conditions of 1800° C. for 2 hours. Part (a) is an image of the 3D structure at 80× magnification depicting the lattice structure formed by DIW.

Part (b) is an image of a portion of the material of a beam of the lattice depicted in part (a). The image is 1000× magnification. Part (c) is an image of a portion of the material of part (b) at 5000× magnification. The field depicts the overall particle size distribution, porosity, and connectivity of a partially sintered structure. Part (d) is an image of a portion of the material of part (c) at 25,000× magnification. The field depicts the microstructure of porous partially sintered SiC particles. In particular, the magnified view illustrates the connectivity of the individual particles, generated from partial sintering, and the porosity. Pore sizes as shown in the image are in a range of 10s of nanometers to about 1 μm. The pores in the partially sintered SiC shown in part (d) represent a combination of mesopores and macropores. The overall porosity of the material is approximately 55%.

Figure 7:
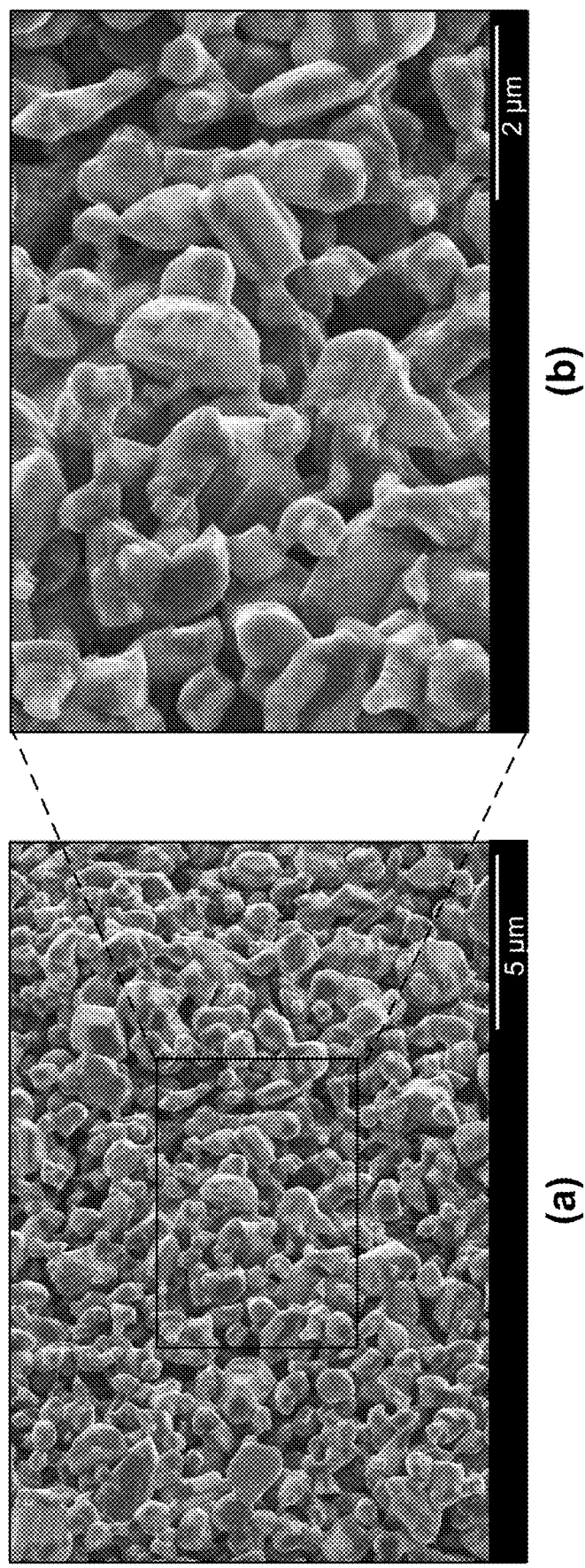
FIG. 7 depicts a series of images of a partially sintered SiC material, 3D printed by direct ink writing in a dense cylinder structure, according to one embodiment. Part (a) is a 25,000 magnification of a material, and part (b) is a magnification of a portion of the field of part (a).

FIG. 7 depicts a series of SEM images of a porous ceramic 3D structure formed as a dense cylinder structure by DIW. The structure was formed with an ink having 45 vol. % 2 μm SiC particles. The formed 3D structure was partially sintered under conditions of 1800° C. for 4 hours (twice the sintering time as used in the structure depicted in FIG. 6). Part (a) is an image of the material of the 3D structure at 10,000× magnification. The field depicts the structure of the material and the particle size distribution. Part (b) is an image of a portion of the material depicted in part (a). The image is 25,000× magnification. The pores in the partially sintered SiC shown in part (b) represent a combination of mesopores and macropores. The connectivity of the ceramic particles is notably more connected, sintered, merged, etc. compared to the connectivity of the ceramic particles depicted in part (d) of FIG. 6 that were sintered for half the time (2 hours compared to 4 hours).

Loading Porous Ceramic Structure with Aminopolymer

The open porosity of ceramic material may be partially filled with an amine-containing sorbent material to yield an overall composite, solid sorbent material. Table 1 lists loading and pseudo-equilibrium $CO_2$ uptake data for exemplary $CO_2$ sorbents such as amine-containing sorbent additives. Partially sintered porous SiC support monoliths were impregnated with PEI (800 MW, branched) via a submersion and drying method. Theoretical loading refers to expected quantity of PEI to be captured in pore volume based on PEI solution concentration. Pore filling fraction is based on loading and bulk density of PEI and estimated pore volume of porous SiC support. $CO_2$ capacity data based on pseudo-equilibrium uptake data from adsorption isotherms measured at 25° C. Ultimate PEI loading across all three exemplary samples closely reflected the expected loading from the impregnation method. The sorbent with moderate PEI loading, PEI/SiC

TABLE 1

Adsorption of $CO_2$ in porous sorbent ceramic supports

| Sample | Theoretical loading ($g_{PEI}/g_{SiC}$) | Experimental loading ($g_{PEI}/g_{SiC}$) | Pore filling (vol. %) | <1% $CO_2$ capacity ($mmol_{CO2}/g_{PEI}$) | 10% $CO_2$ capacity ($mmol_{CO2}/g_{PEI}$) |
|---|---|---|---|---|---|
| PEI/SiC-0.1 | 0.038 | 0.043 | 11 | 0.048 | 1.2 |
| PEI/SiC-0.25 | 0.11 | 0.13 | 7 | 0.41 | 3.7 |
| PEI/SiC-0.5 | 0.21 | 0.28 | 65 | 0.13 | 0.6 |

0.25, demonstrated the greatest $CO_2$ sorption capacity at ultra-dilute and 10% $CO_2$ concentrations. Even at very low PEI loadings, PEI/SiC-0.1, reasonable utilization of the sorbent additive was demonstrated indicating no disadvantageous polymer-support interaction. At high PEI loading, PEI/SiC-0.5, a partial reduction in PEI uptake efficiency was noted, attributed to larger scale polymer phases due to relatively low porous SiC support surface area. Reduction in pore size and thus increased surface area may improve uptake efficiency at high PEI additive loadings.

In Use

Various embodiments described herein may be developed for $CO_2$ capture from concentrated streams, simulated flue gas, simulated air, etc.

According to one approach, an embodiment may be used for $CO_2$ capture from atmospheric air, flue gas, or other streams. In one approach, the use the porous ceramic product may include $H_2S$ capture from biogas. In various approaches, the use may include catalyst support, structural components, separation such as oil, heavy metal clean up, etc. For example, a sorbent may be synthesized having specific amine additives to selectively adsorb $H_2S$ over $CO_2$ that may be present in significant quantity in the biogas.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed is:

1. A porous sorbent ceramic product comprising:
   a three-dimensional structure comprising an electrically conductive ceramic material, wherein the conductive ceramic material has an open cell structure with a plurality of intra-material pores;
   a sorbent additive present in the intra-material pores of the conductive ceramic material for adsorption of a gas; and
   at least two electrodes in electrical communication with the conductive ceramic material.

2. The product as recited in claim 1, wherein the three-dimensional structure is characterized as exhibiting sufficient joule heating upon application of an electrical current thereto to drive adsorbed gas from the sorbent additive.

3. The product as recited in claim 1, comprising a plurality of inter-material pores, wherein an average diameter of the inter-material pores is in a range of about 100 microns to about 1 millimeter.

4. The product as recited in claim 1, wherein an average diameter of the intra-material pores is in a range of greater than 0 nanometers to less than 10 microns.

5. The product as recited in claim 1, wherein the conductive ceramic material has at least one physical property selected from the group of physical properties consisting of: a thermal conductivity of the ceramic material is in a range of greater than 1 to about 100 W/mK, an electrical conductivity of the ceramic material is in a range of greater than 1 to about 1000 reciprocal ohm per centimeter, and a surface area of the three-dimensional structure is in a range of greater than 1 to about 500 m$^2$/g.

6. The product as recited in claim 1, wherein the sorbent additive is present in a range of greater than 20 weight percent to less than 70 weight percent of a combined weight of the sorbent additive and ceramic material.

7. The product as recited in claim 1, the sorbent additive is selected from the group consisting of: an organic molecule, an oligomer, a polymer, an aromatic polymer, a non-aromatic polymer, and a co-polymer.

8. The product as recited in claim 1, wherein the sorbent additive is selected from the group consisting of: an amine-containing sorbent additive, a hydroxyl-containing sorbent additive, a carbonate-containing sorbent additive, a phosphate containing sorbent additive, and a combination thereof.

9. The product as recited in claim 8, the sorbent additive being the amine-containing sorbent additive comprising: a structure selected from the group consisting of:
a branched structure, a linear structure, and a dendritic structure; and
a molecular weight in a range of $10^2$ to $10^5$ daltons.

10. The product as recited in claim 9, wherein the amine-containing sorbent additive is selected from the group consisting of: poly(alkylamine), poly(ethylenimine), poly(propylenimine), poly(vinylamine), poly(allylamine), and a combination thereof.

11. The product as recited in claim 1, wherein the conductive ceramic material includes at least one material selected from the group consisting of: a metal carbide, a metalloid carbide, a metal boride, a metalloid boride, a metal oxide, a metalloid oxide, a metal nitride, a metalloid nitride, a metal silicide, and a combination thereof.

12. A porous sorbent ceramic product comprising:
a three-dimensional structure comprising an electrically conductive ceramic material, wherein the conductive ceramic material has an open cell structure with a plurality of intra-material pores;
a sorbent additive present in the intra-material pores of the conductive ceramic material for adsorption of a gas; and
at least two electrodes in electrical communication with the conductive ceramic material, wherein the three-dimensional structure has a pre-defined geometric arrangement of features comprising:
a plurality of filaments comprising the conductive ceramic material having the intra-material pores, and,
a plurality of inter-material pores defined between adjacent filaments, wherein the inter-material pores form continuous channels from one side of the structure to the other side of the structure.

13. The product as recited in claim 1, wherein the at least two electrodes are positioned for application of an electrical current to the ceramic material to cause joule heating of the conductive ceramic material thereto to drive adsorbed gas from the sorbent additive.

14. The product as recited in claim 1, wherein the electrodes comprise a material that is different than the electrically conductive ceramic material.

15. The product as recited in claim 12, wherein the three-dimensional structure is characterized as exhibiting sufficient joule heating upon application of an electrical current thereto to drive adsorbed gas from the sorbent additive.

16. The product as recited in claim 12, wherein an average diameter of the inter-material pores is in a range of about 100 microns to about 1 millimeter.

17. The product as recited in claim 12, wherein an average diameter of the intra-material pores is in a range of greater than 0 nanometers to less than 10 microns.

18. A method of forming the product as recited in claim 1, the method comprising:
forming a three-dimensional ceramic support, wherein the three-dimensional ceramic support comprises an electrically conductive ceramic material configured for joule heating,
heating the three-dimensional ceramic support at a temperature for an effective duration of time to result in the conductive ceramic material having a plurality of intra-material pores; and
incorporating a sorbent additive into the intra-material pores of the conductive ceramic material.

19. The method as recited in claim 18, wherein the electrically conductive ceramic material has a porosity in a range of 25% to 70%.

20. The method as recited in claim 18, wherein incorporating the sorbent additive includes:
immersing the ceramic support in a mixture of the sorbent additive suspended in a solvent; and
drying the ceramic support to remove the solvent by evaporation.

* * * * *